April 5, 1966  J. PATERSON  3,244,863
MACHINE CONTROL COMPUTER
Filed Oct. 10, 1961  10 Sheets-Sheet 1

FIG. I.

INVENTOR:
JOHN PATERSON
BY
Howson & Howson
ATTYS.

April 5, 1966 J. PATERSON 3,244,863
MACHINE CONTROL COMPUTER
Filed Oct. 10, 1961 10 Sheets-Sheet 2

INVENTOR:
JOHN PATERSON
BY Howson & Howson
ATTYS.

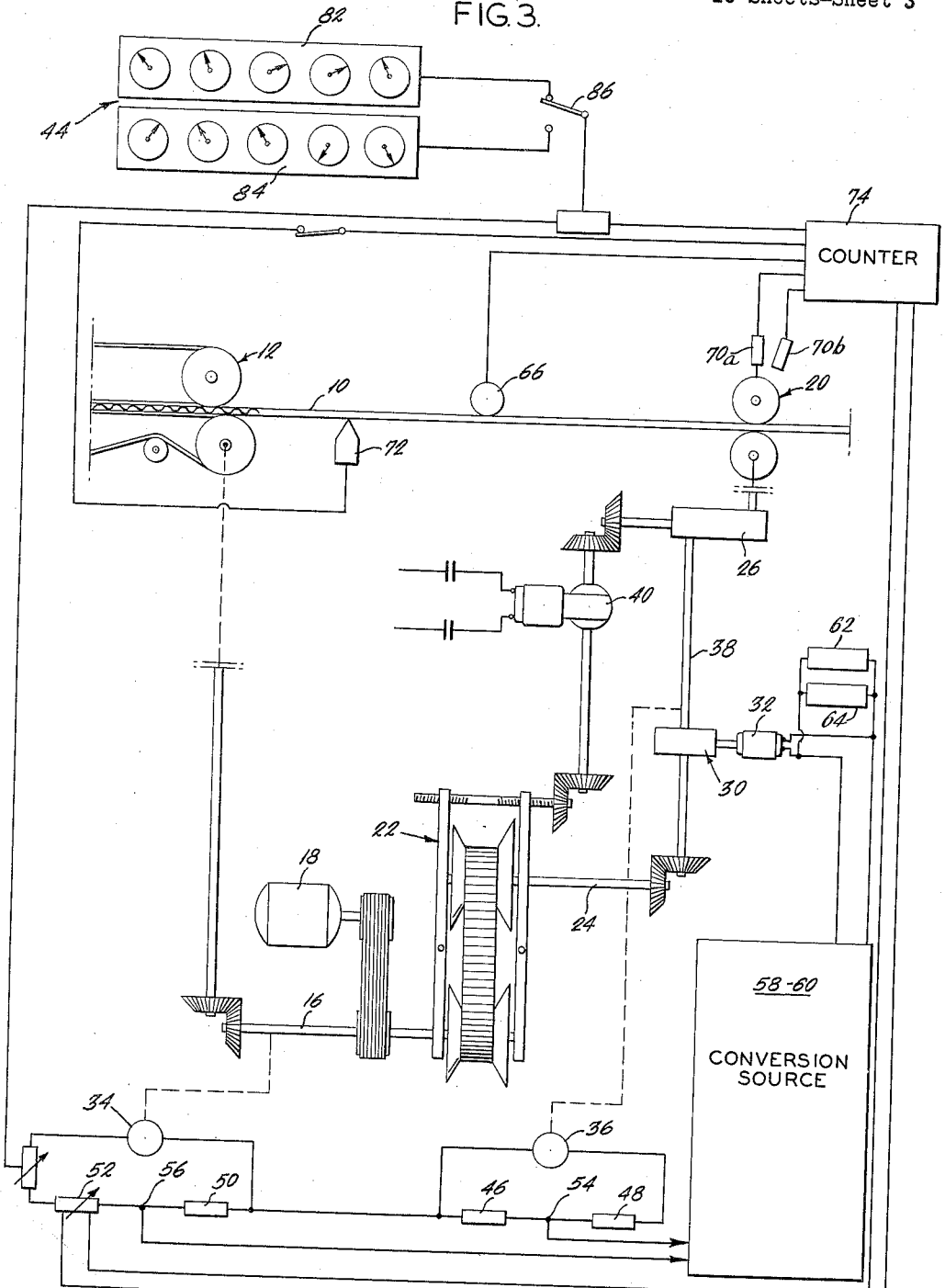

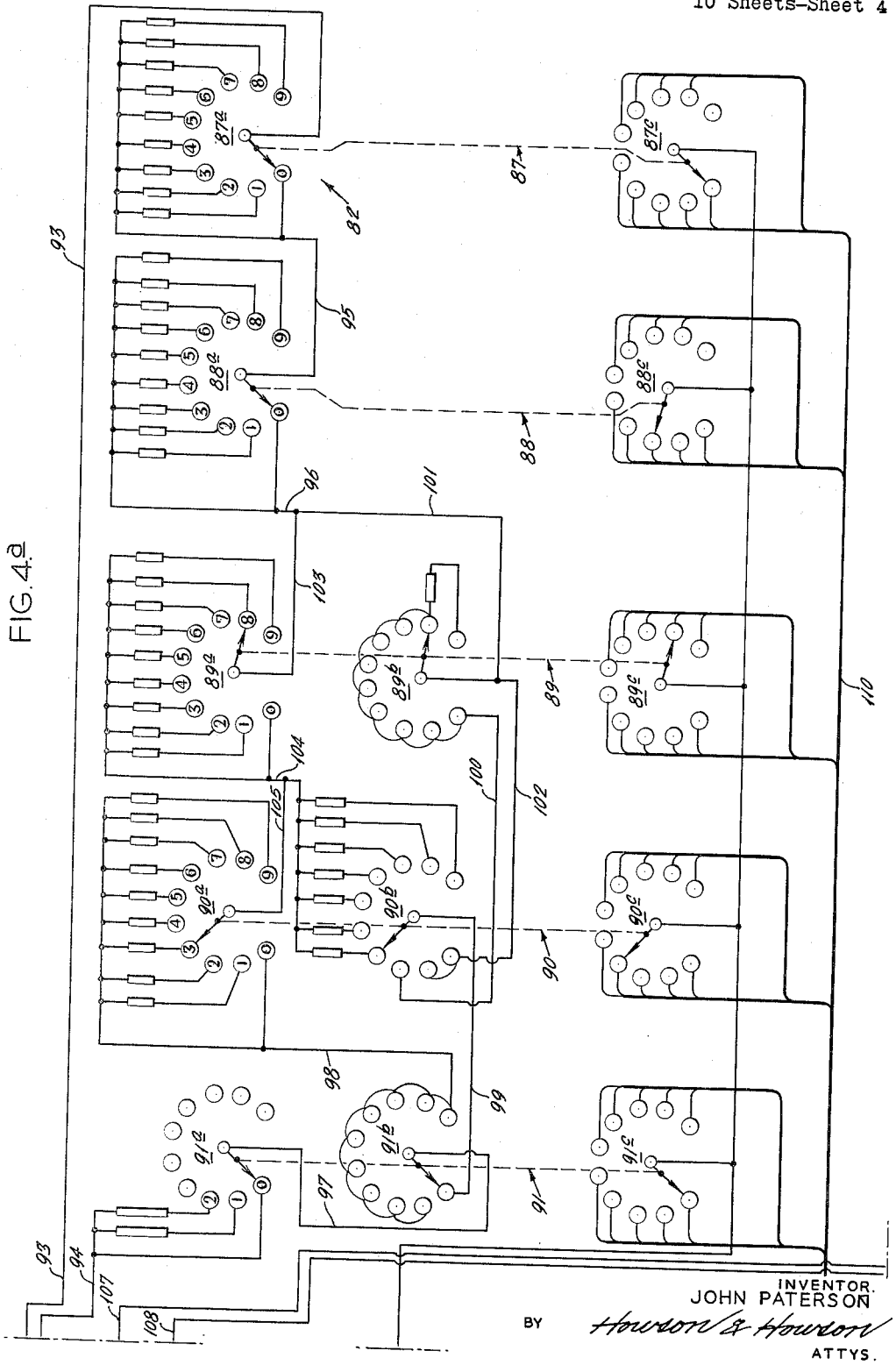
FIG.4.a

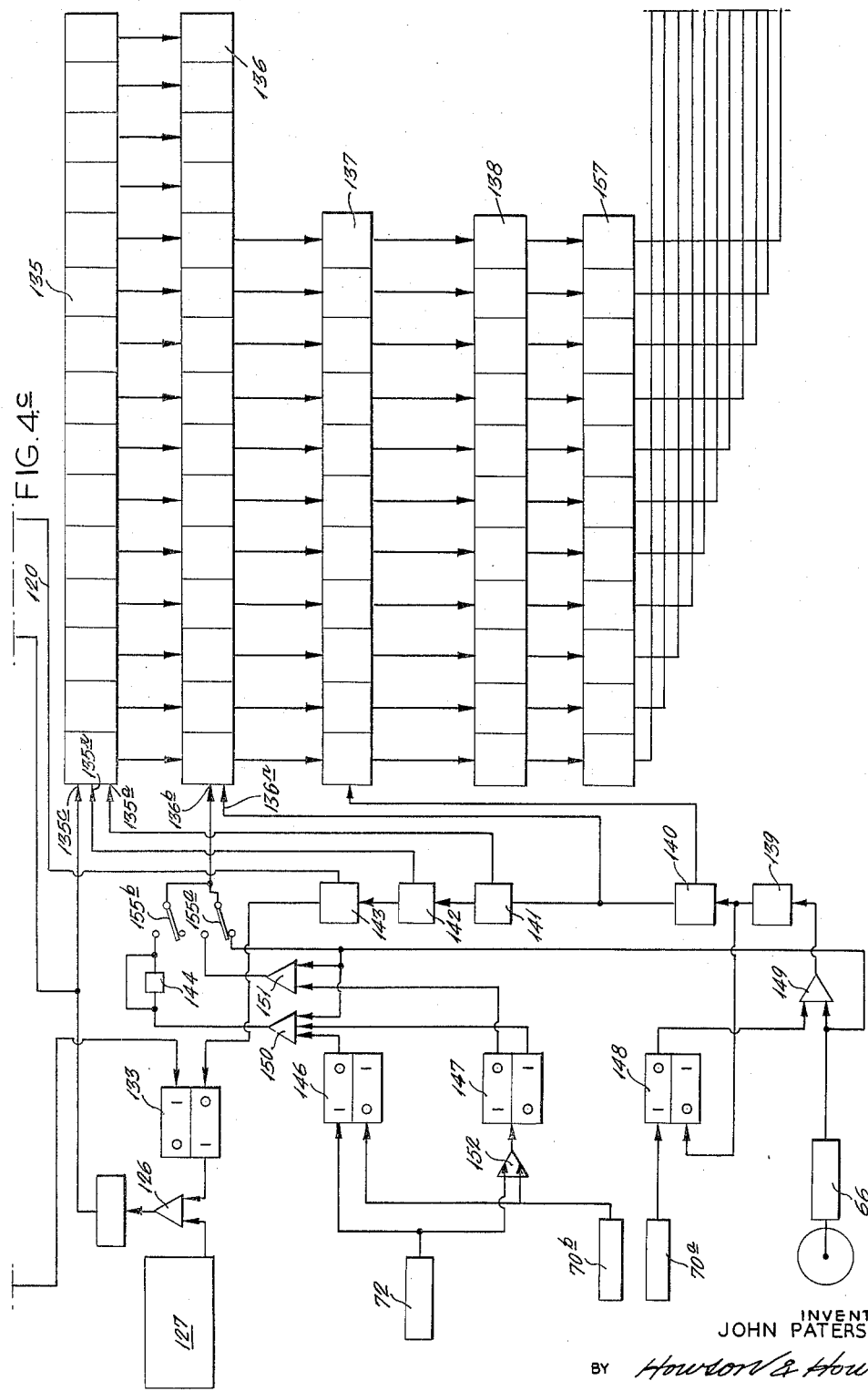

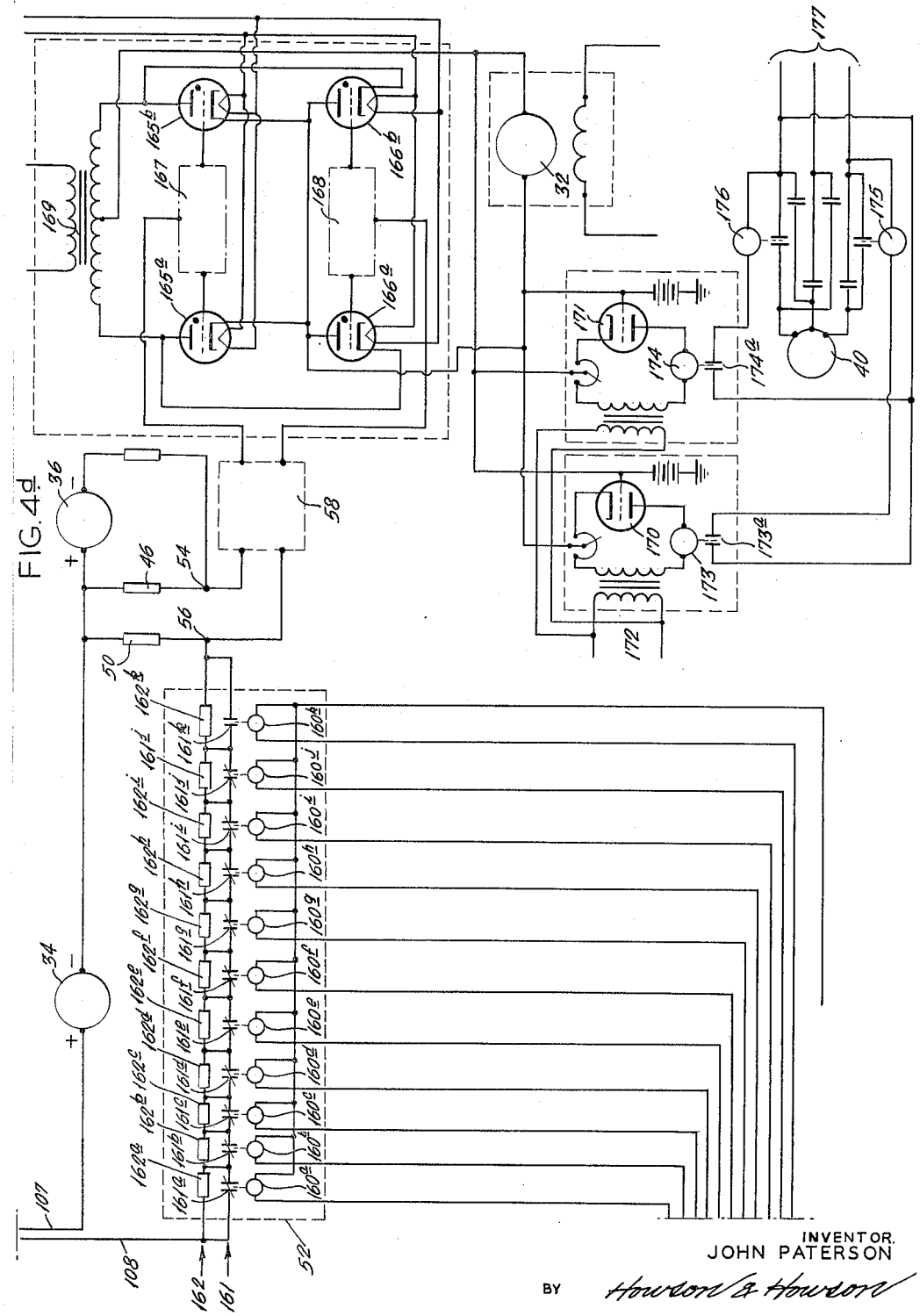

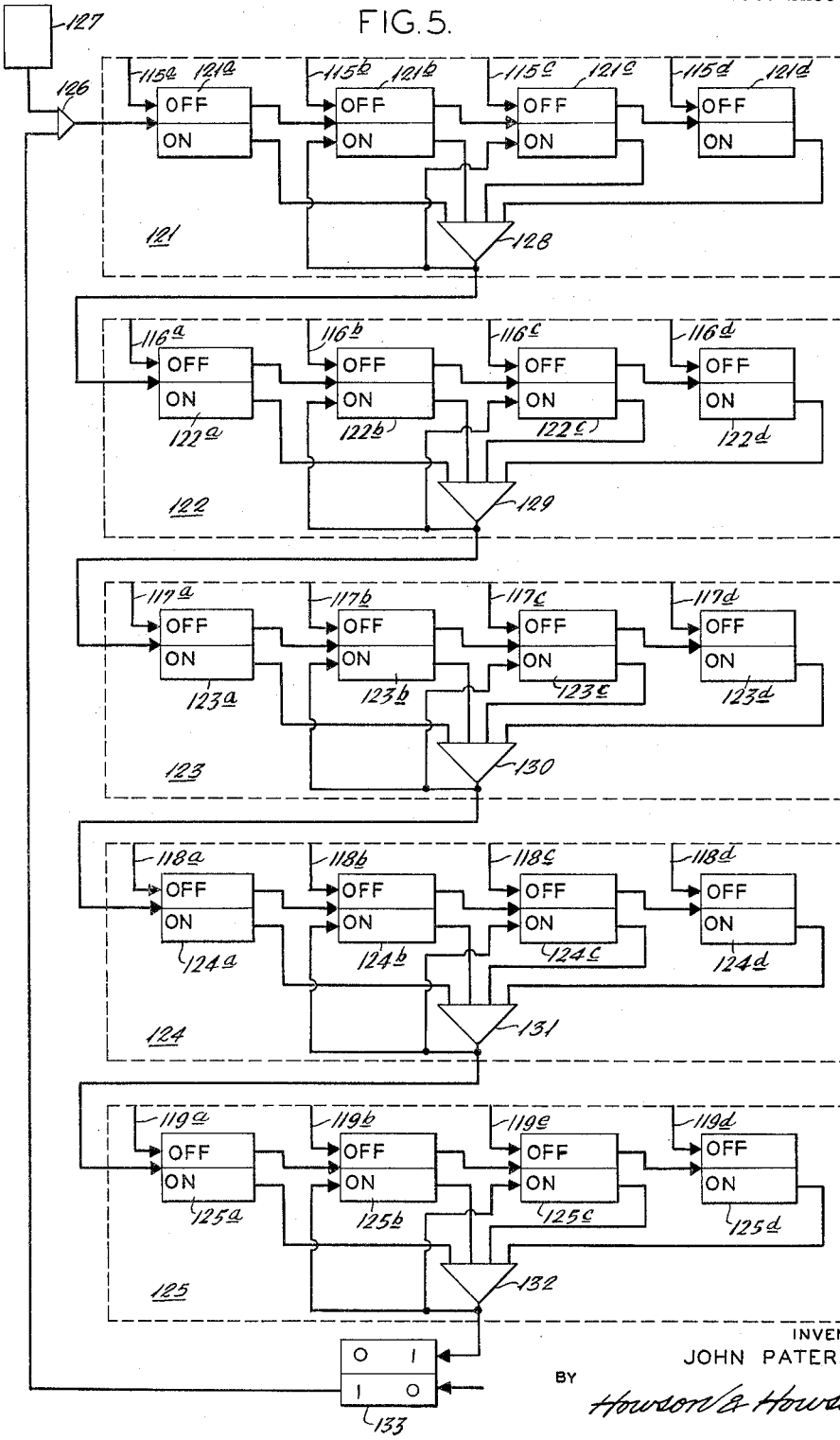

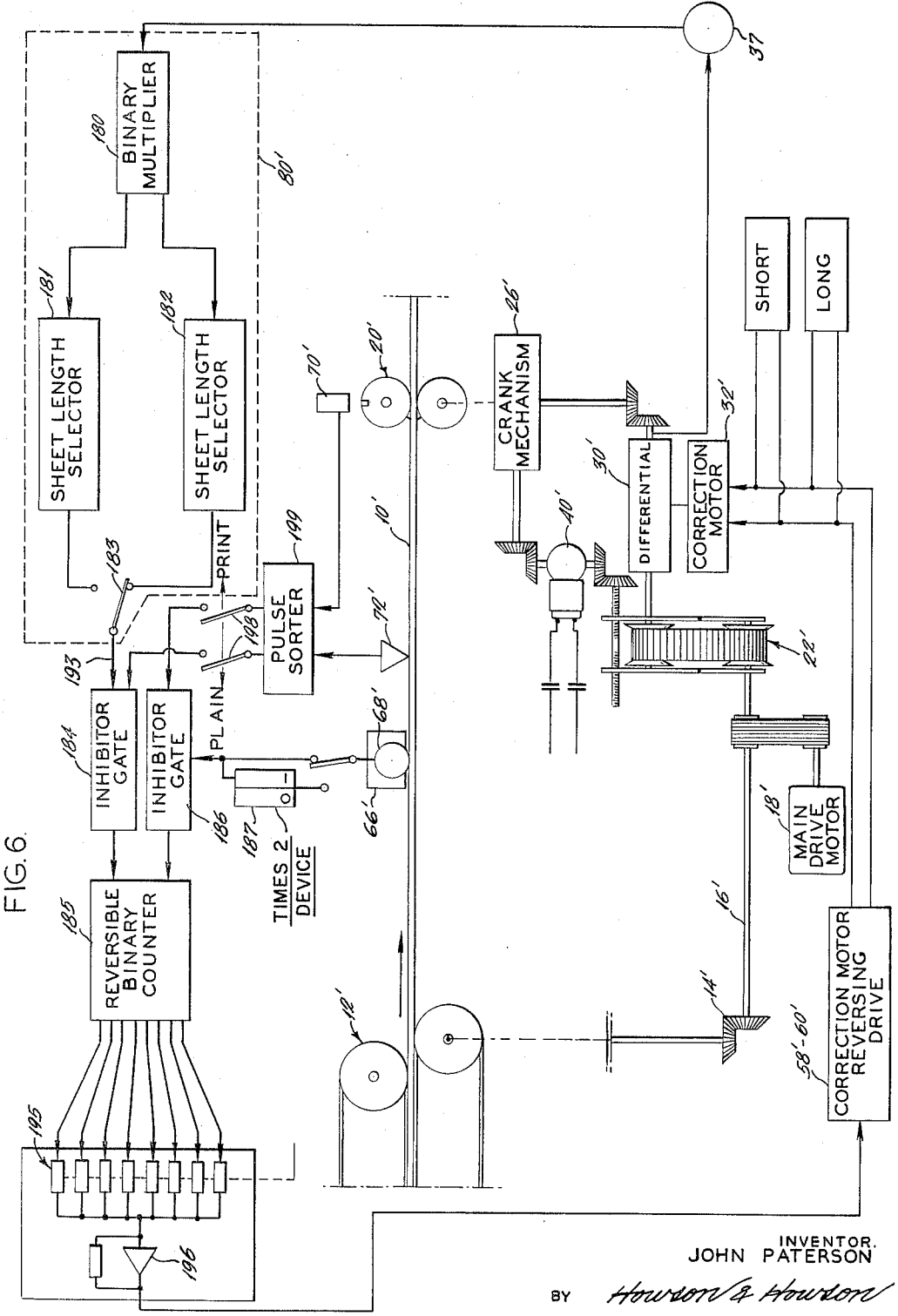

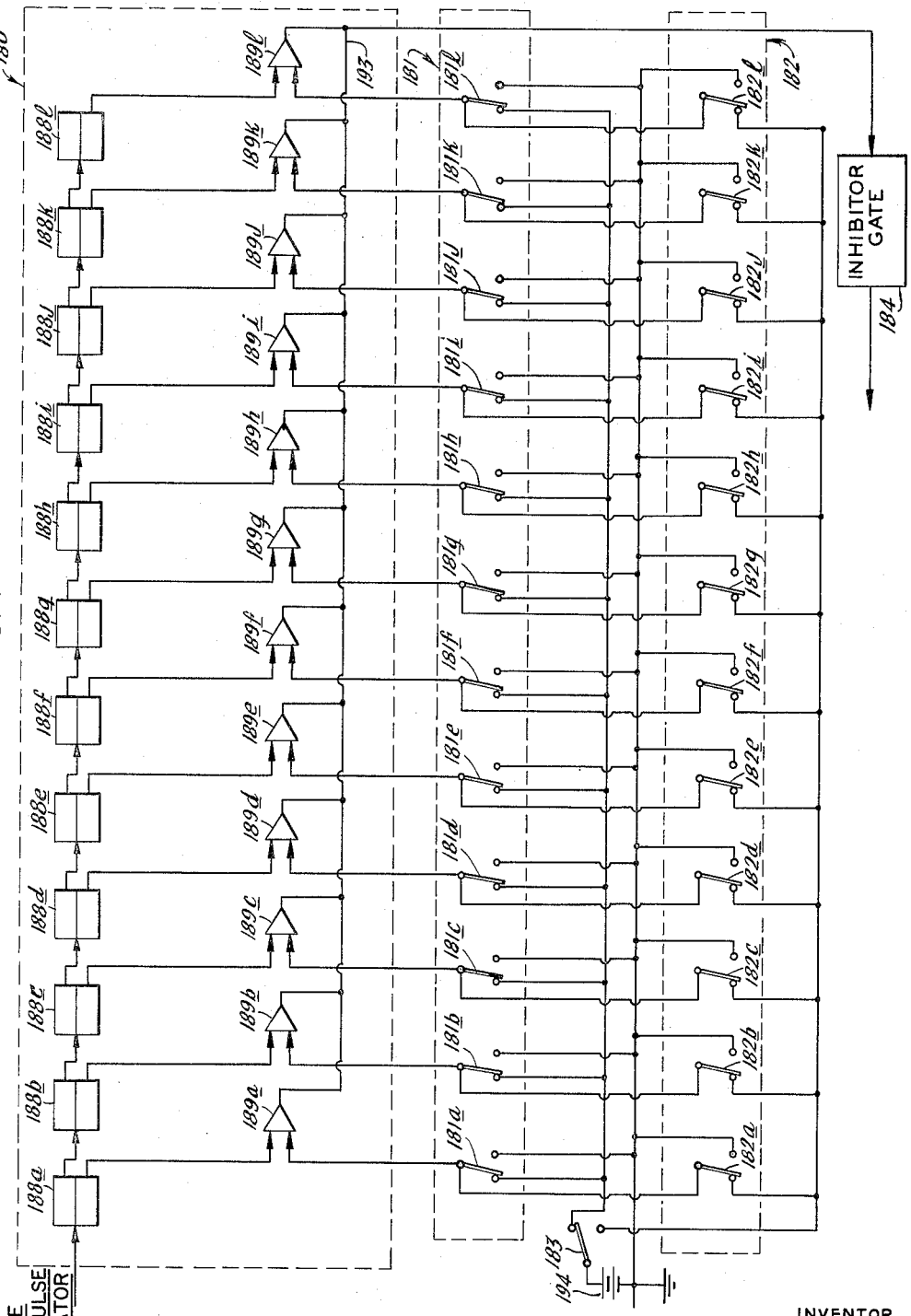

United States Patent Office 3,244,863
Patented Apr. 5, 1966

3,244,863
MACHINE CONTROL COMPUTER
John Paterson, Springfield, Pa., assignor to Samuel M. Langston Company, Camden, N.J., a corporation of New Jersey
Filed Oct. 10, 1961, Ser. No. 144,224
25 Claims. (Cl. 235—151.11)

This is a continuation-in-part of my co-pending United States application Serial No. 836,694, filed August 28, 1959, for Machine for Processing Linear Material now United States Patent No. 3,195,385.

The present invention relates to a machine control computer for controlling the processing of continuously moving linear material at predetermined intervals. More specifically this invention relates to digital computer means in which deviations of the processing from a precise interval of preselected length are sensed and correction for the error is calculated and applied to the machine by the computer. The computer also makes possible automatic selection or adjustment of the length or distance between the points of repetitive processing on the continuously moving linear material.

The machine control computer of the present invention is applicable to the machinery described in the specification of the above-identified parent application which describes the computer in general terms. It is also applicable to other types of linear processing machinery within the scope of the claims of said earlier application. The digital techniques may be applied to the analog computer described in said application or the digital computer may itself close the loop between the sensing means and the correction means of the machine.

When the machine employs an analog computer correction, the digital computer has a supervisory function in that it detects errors which the analog has missed or which it is incapable of finding. The analog computer preferably functions to permit selection and variation of the length of linear material between successive points of processing which is proceeding continuously. It also functions automatically and continuously to correct any errors which occur in the predetermined length once that length is selected and which would occur should the feed means and the repetitive processing means become out-of-step for that predetermined length for any reason. Correction of errors which may have been overlooked or neglected by the analog or which may result from causes other than those monitored by the analog are handled by the digital computer. Slippage of the continuous material being processed relative to the feed means, for example, may be monitored and corrected for by the digital computer. Additional functions may also be performed by the digital computer, For example, the digital computer may be used to make certain that preprinted continuous material is processed at the proper places relative to the printing.

Where the machine employs only a digital computer, the digital computer assumes all the functions of the analog as well as those of the digital computer in the analog controlled system. It provides not only secondarily but primarily for length correction and new length selection is performed by it as well. It is capable of accomplishing everything that the analog system is able to do including such things as assuring proper registration between the repetitive process and the preprinted matter on the continuous material.

The present invention for the first time uses a digital computer for detecting error and correcting that error as part of a closed loop control system in a machine for repetitive processing of corrugated board. It is also novel in that it employs means to measure the speed of the continuous web. This means may be placed almost immediately adjacent the repetitive processing means thereby almost certainly eliminating all chance of error in the short distance between this means and the processing means. The means is also preferably a pulse generating device generating a fixed number of pulses per unit length, hence representing speed. Such pulses are then compared either with a count established by length selection means or with other pulses indicative of speed of the repetitive processing means.

The machine control computer of the present invention then is broadly useful for repetitively processing linear material by a machine which has at least the following essential features: feed means for the continuous material; repetitive processing means for acting upon the continuous material at predetermined intervals; and means for automatically and continuously adjusting the relative speeds of the feed and processing means. The computer requires means for sensing the speed of the continuous material and the speed of the processing means, respectively, and for producing signals representative of each. At least one of signal producing means produces pulses, the rate of which is representative of the speed sensed. Comparison means, including length selection means, is provided for selecting a preselected length of continuous material between corresponding successive points of the continuous processing means to compare the speeds sensed against the preselected length and produce an error signal output if the speed sensed would produce a length between successive processing different from the length preselected. Means for feeding the error signals from the computer back to motor means then serves to adjust and make corrections in the relative speeds of the feed means and repetitive processing means.

Speed sensing means is used in its broad sense to imply a time or rate base to the signals received. Where the distance between the fronts of two pulses represents a particular fixed length, the rate of repetition of those pulses represents a speed or length per unit time. Where a single pulse is employed to indicate a particular position of same device, such as the repetitive processing means, the number of pulses per unit time indicate speed, such as revolutions per minute. The location of a pulse is also used to define the position of an element having repetitive action at a given time. Comparison may be strictly on the basis of rate or it may be on the basis of pulse location within the scope of the present invention.

For an understanding of the present invention the accompanying drawings show embodiments of the present invention using the digital computer both as an auxiliary to an analog computer and as the principal link in the feedback error sensing and correction loop. In the drawings:

FIG. 3 is a highly schematic diagram combining the machine of FIG. 1 and the computer of FIG. 2;

FIG. 4a is a circuit diagram showing one bank of sheet length selector switches and related circuitry of FIGS. 2 and 3;

FIG. 4b is a circuit diagram of the alternative bank of sheet length selection switches and switch means for selecting this bank or the bank of FIG. 4a;

FIG. 4c is a logic diagram of the digital computer of FIG. 2;

FIG. 4d is a circuit diagram showing much of the analog computer of FIG. 2 and showing in detail the error correction resistance chain controlled by the digital computer and the comparator and control circuitry for correcting errors which occur in the course of processing the sheet material;

FIG. 5 illustrates schematically the multivibrator chain shown schematically in FIG. 4b and its connection to elements shown in FIG. 4c;

FIG. 6 is a schematic showing of another computer embodiment for use with the system shown in FIG. 1; and FIG. 7 shows in detail the sheet length selector, switch banks, the selector switch and binary multiplier of FIG. 6.

Figure 1:
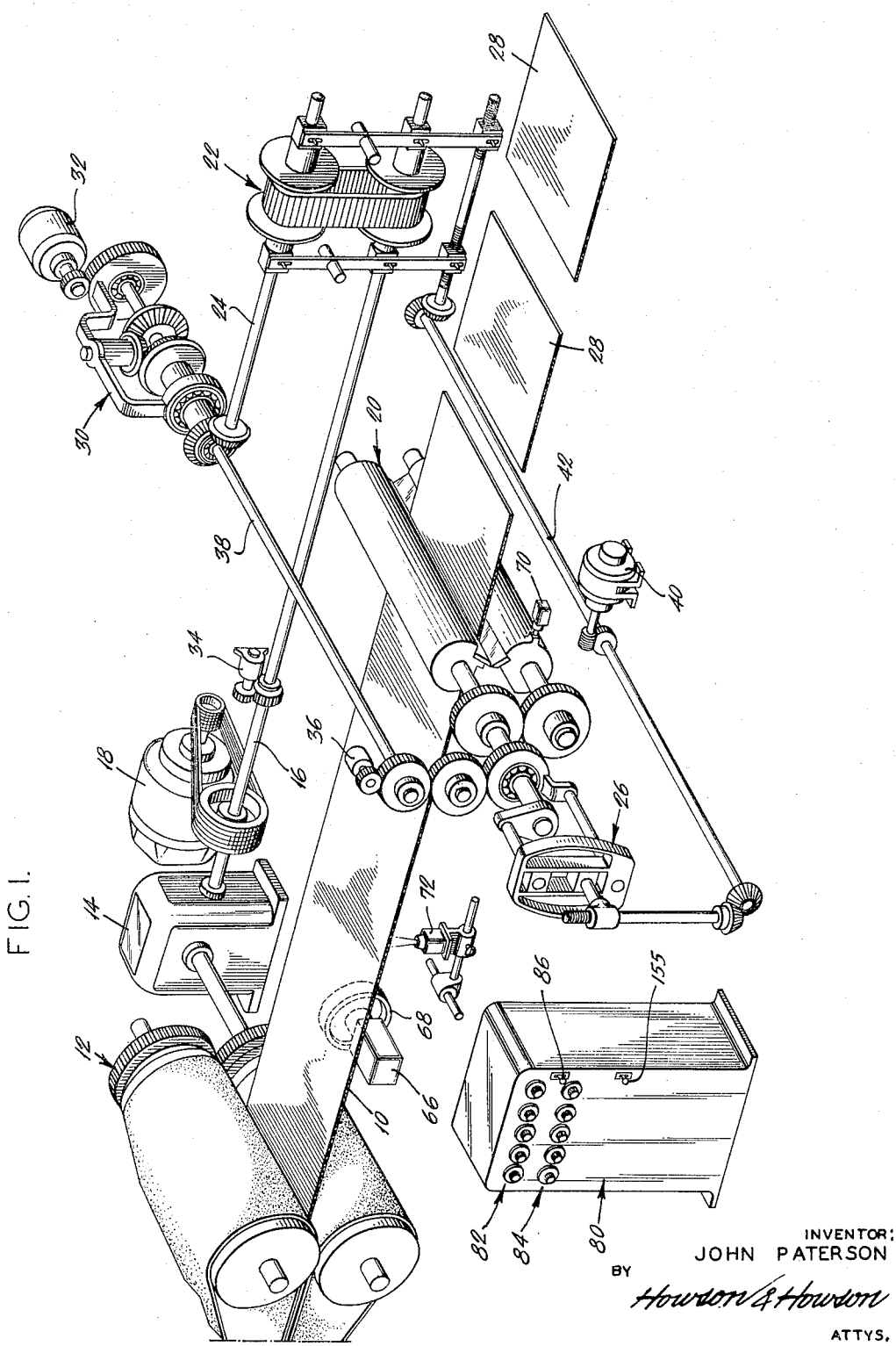
FIG. 1 illustrates in perspective a schematic arrangement showing essential elements in a continuous sheet cut-off machine whereby uniform sheet length may be obtained by use of the computer.

Application of the present invention will be explained with relation to a sheet cut-off mechanism schematically shown in FIG. 1 and only in such detail as to present an understanding of the invention. A continuously moving web of material 10 is continuously fed from a double facer mechanism 12 of an usual type, in a known manner. The double facer 12 is driven through transmission 14 and main drive shaft 16 which in turn is driven by main drive motor 18. A usual known type of cut-off means consists in knife cylinders 20. A variable speed transmission shown here as consisting of a Reeves drive is shown at 22 which is operatively connected at its input end with main drive shaft 16. The output of the Reeves drive is connected by drive shaft 24 by means of shaft 38 to a crank mechanism 26 of a type shown and described in Behrens Patent No. 2,389,341 and has as its purpose to produce a knife velocity equal to the velocity of the web while the blades are in contact with the web. The sheet length of the cut sheets 28 is equal to the web advance during one revolution of the knife cylinders 20 and is established by adjusting the ratio of the variable speed Reeves drive type transmission 22. Any slippage which occurs between the web and the double facer which feeds the same, slippage of the Reeves belt drive, and incorrect setting of the Reeves ratio will produce an error in the sheet length. A differential gear train broadly designated 30 has been inserted on the shaft between the crank mechanism 26 and the Reeves drive output shaft 24. An electric motor 32 is adapted to drive the arm of the gear train carrying the planet gears of the differential. Counterclockwise rotation of this motor is adapted for increasing the knife cylinder average velocity, thus making the sheet length slightly shorter. Clockwise rotation will decrease the knife cylinder average velocity, thus increasing the sheet length. The amount of increase or decrease in the sheet length is proportional to the speed of motor 32.

The main line drive shaft 16 is a common drive connecting the cut-off to the double facer or web feeding machine, thus assuring the same driving speed to and on both machines. Shaft 16, and consequently the double facer and the cut-off, are, as pointed out hereinbefore, driven by a main drive motor 18. A tachometer generator 34 is geared to and driven by the line shaft 16. The output voltage of generator 34 is directly proportional to its speed. Since generator 34 and the web are driven by the line shaft, the voltage of this generator is directly proportional to the web speed, providing no slippage occurs.

A second tachometer generator 36 is geared to and is driven by input shaft 38 to the knife cylinder crank mechanism 26. The output voltage of generator 36 is also directly proportional to its speed. Since generator 36 and the knife cylinders share a common drive, the voltage output of generator 36 will be proportional to the average speed of the knife cylinders. As will appear hereinafter, with reference to a description of the circuitry involved, at a constant web speed, the voltage of generator 34 will be constant. At this same constant web speed, the voltage of generator 36 will be inversely proportional to the sheet length, that is, at a short length the knife cylinder and generator speed will be greater than on a long sheet length. Adjustment of sheet length through the Reeves drive is accomplished by means of motor 40 operating through shaft 42 which interconnects the Reeves drive 22 and crank mechanism 26 as shown.

Figure 2:
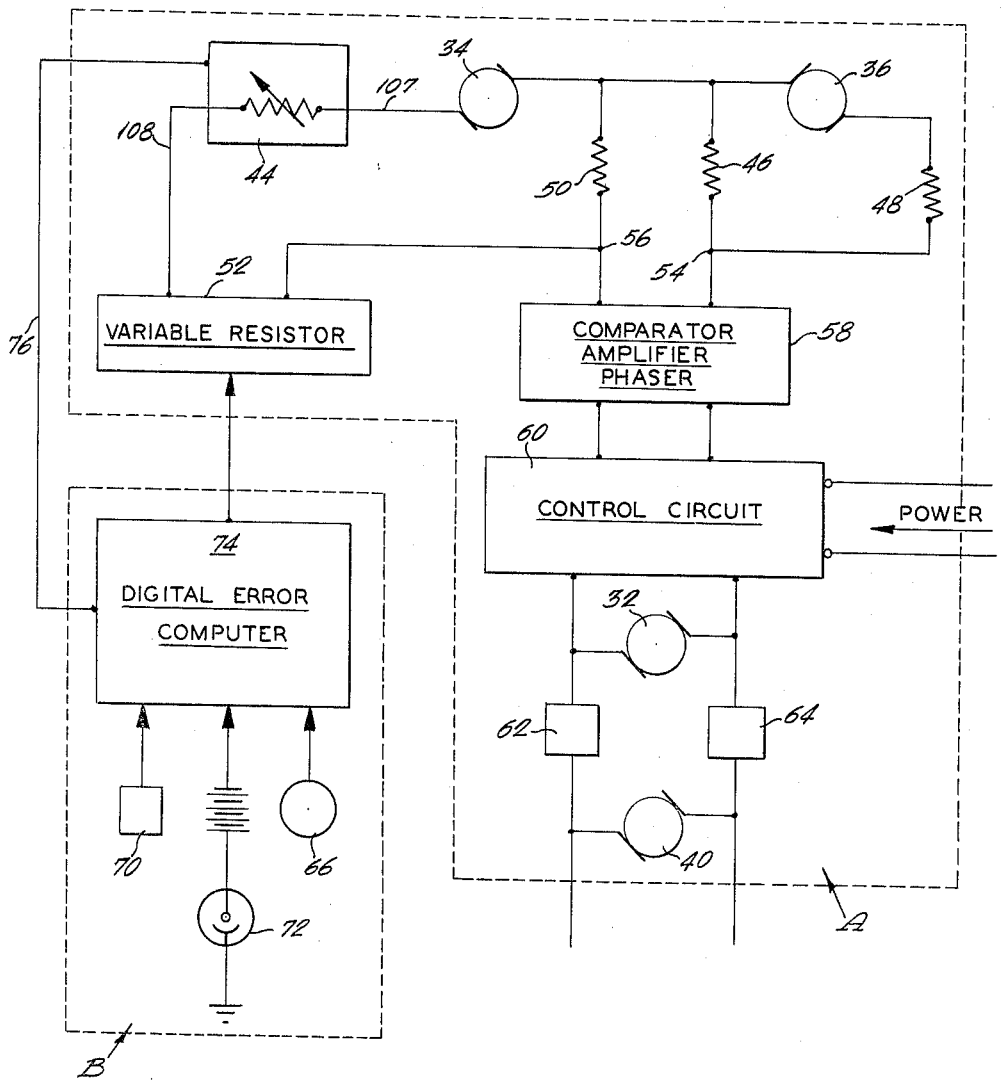
FIG. 2 is a block diagram of one embodiment of the computer.

The computer controlling the machinery of FIG. 1 is shown in highly schematic form in FIGS. 2 and 3. FIG. 2 is a block diagram of the computer with its associated sensing elements and speed correction means. FIG. 3 shows essentially the same elements as both FIGS. 1 and 2 but in less detail.

The computer circuitry may be subdivided into analog and digital portions, the analog circuit appearing within the enclosure A formed by one set of dashed lines and the digital circuit appearing within the enclosure B formed by another set of dashed lines. The analog computer is effective to compare the speeds of the double facer 12 or other feed means and the cut-off rolls 20 or other processing means and to detect deviations from relative speeds which would produce inaccuracies in a preselected sheet length or length between similar processing points. The digital computer is an overriding error detection and correction device which acts upon the analog computer to correct errors arising from causes other than inaccuracies in speeds of the double facer and cut-off rolls. Correction is accomplished by differential drive motor 32 and Reeves drive shifter motor 40.

As previously explained, the output of tachometer 34 indicates the speed of the drive, double facer 12, whereas tachometer 36 indicates the speed of the cut-off rolls 20. Referring first to the analog computer circuitry in FIG. 2, it will be observed that each of the tachometers 34 and 36 is in circuit in a resistance loop. Tachometer 36 is in a loop formed by fixed resistance elements 46 and 48, each of which is preferably highly precise. In the loop with the tachometer generator 34 are also resistors. A fixed resistor 50, corresponding in position to resistor 46, and variable resistors 44 and 52 are employed. The effect of the resistors in each loop is to limit the current flowing through the loop and to provide a voltage drop from one terminal of the tachometer generator to the other. Thus it will be appreciated that changes in the resistance of variable resistors 44 or 52 will affect the currents produced at a particular speed and the distribution of voltage drop around the loop. The voltage across the tachometer generator for a particular speed is, of course, fixed.

The analog of sheet length is the resistance on one of the tachometer generator loops. Either loop might be selected but where, as here, the sheet length selection is made by varying resistance in one of the loops, the resistance of that loop is the analog of the selected linear distance and the other loop usually provides a fixed standard. In addition to the variable resistance for representing different sheet lengths, an error correction variable resistance is employed in one of the loops, usually the same loop as the other variable resistance.

Figure 4B:
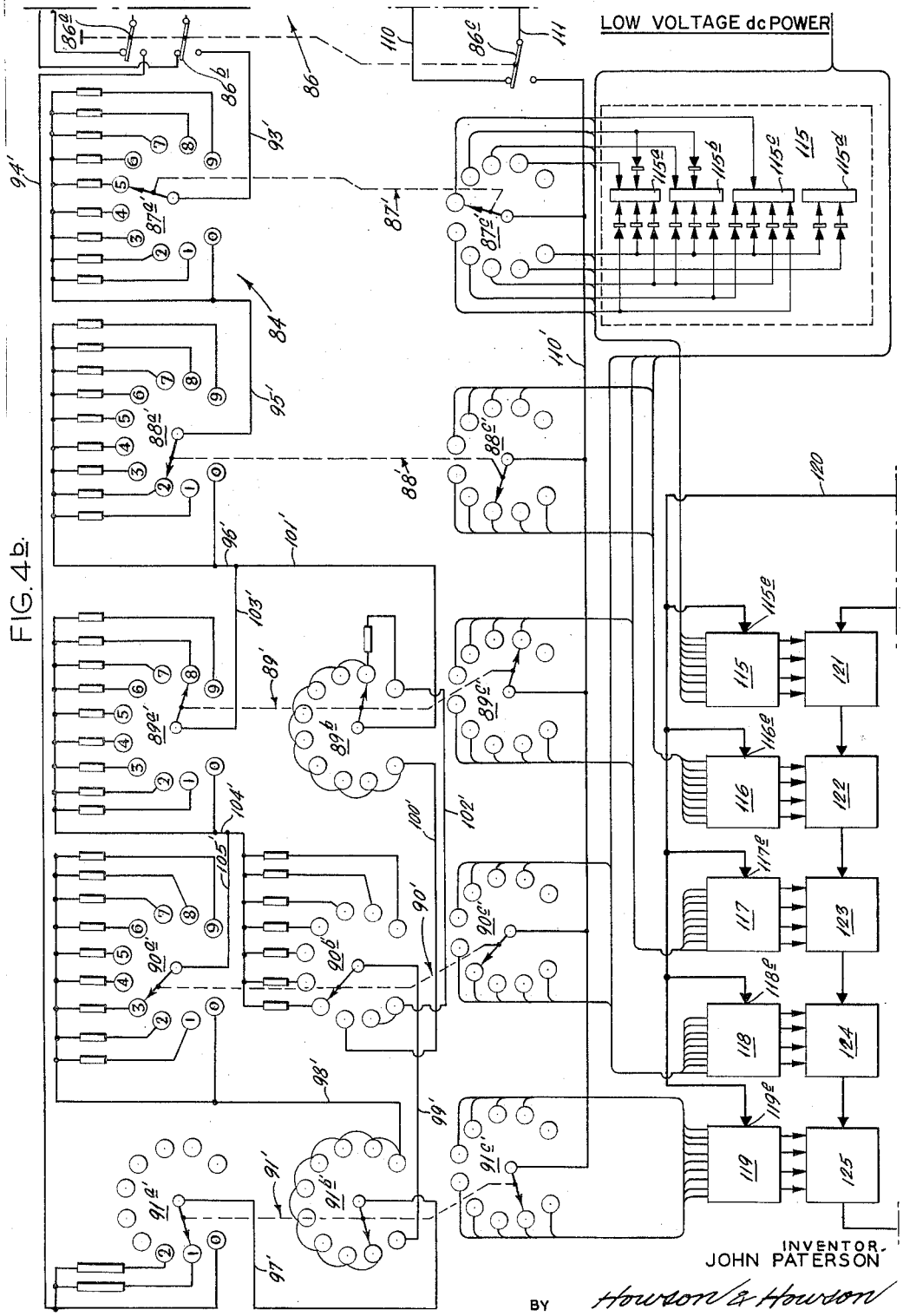

The sheet length selecting variable resistance is represented in FIG. 2 as the simple variable resistance 44 in series with tachometer generator 34 although in practice it is preferably a complex bank of highly precise resistances such as those shown in FIGS. 4a and 4b. FIG. 3 schematically illustrates the resistance 44 as a pair of resistance switch banks 82 and 84 alternatively selectable by switch 86. Each of these identical banks is provided with five selection switches whereby the resistance may be selected to five significant figures. In practice the calibration is usually so selected that the lowest significant figure is in hundredths of an inch.

The error correcting resistance 52 is also preferably composed of incremental parts that are switched in or out of the resistance in response to commands of the digital computer acting in response to sensed errors. The error correction function of resistances 52 could be located as well in the resistance loop of tachometer 36 by making appropriate changes, but the mere straightforward approach is illustrated.

The direct current output of tachometer generator 34 is directly proportional to web speed (per line shaft 16 and double facer 12) provided no slipping occurs. The direct current output of tachometer generator 36 driven by input shaft 38 to the knife cylinders 20 is proportional to the average speed of the knife cylinder. Thus, assuming no slipping, when the web and the knife speeds are proper for the cutting of the sheet to the predetermined length, no error signal should be generated. The circuits are so designed that if the relative speeds of the tachometer generators 34 and 36 would indicate no error in sheet length essentially the same voltages will be produced at comparison terminals 54 and 56. Conversely a difference in voltages at terminals 54 and 56 indicates sheet length error. It can therefore be appreciated that a change in resistance at 44 or 52 will change the voltage distribution of its loop at a given speed including the voltage at terminals 54 and 56. To re-balance the voltages, an adjustment in either, or both, double facer and knife speed is required, and voltage balance at terminals 54 and 56 will occur for a different sheet length. This is the mechanism of length adjustment by resistor 44.

The voltages at terminals 54 and 56 are compared by voltage comparator 58. The circuits are designed with parameters such that the voltage difference at comparison terminals 54 and 56 not only indicate error and the direction of error, but the amount of error. If the voltage at terminal 54 is higher than the voltage at terminal 56, a signal will be supplied control circuit 60 through the amplifier and phaser of comparator 58 which drives differential drive motor 32 in the direction to correct the error. If the sheet length is shorter than specified by the setting of resistance 44, the voltage at terminal 56 will be lower than that at terminal 54. Conversely, if the sheet length is too long, the voltage on terminal 56 will exceed the voltage at terminal 54.

Ordinarily where there is no change in resistance 44, the correction motor 40 of the Reeves drive will not be affected. However, whenever the signal reaches a predetermined size, relay elements 62 or 64, depending upon the direction of the required correction as indicated by its polarity, actuate the motor 40 to adjust the Reeves drive 22. This type of correction is required to correct for a major change in the preselected sheet length.

From the above, it will be seen that in the analog computer the tachometer voltage outputs are proportional to the speeds of the elements with which they are driven in synchronism, and the voltage across terminals 54 and 56 are analogous to the error in the system.

Despite the fact that the double facer and the cut-off rolls 20 may be in perfect synchronism to produce the desired sheet length, slippage between the double facer 12 and the web 10 can cause error. The digital computer is intended to compare signals which will detect such errors and then produce a signal which will, in turn, make the correction.

Detection of web speed is made by a rotary transducer type tachometer generator 66 driven by impulse wheel 68 driven by web 10 and detection of knife speed is made by a photo-electric cell or impulse transducer 70 which detects a particular point on the periphery of one of the rollers each revolution. Additionally, if printed matter is to be located relative to the knife edge, a photoelectric detection means, such as 72, may be employed. These detection means advantageously are adapted to be compared in such a way that almost any instantaneous detection and correction is possible.

FIGS. 4a, 4b, 4c and 4d show circuit and/or block or logic diagrams of preferred embodiments of the computer and correction circuitry of FIG. 2. These figures are drawn so that they may be placed in contiguous relationship with one another to show the complete system. In such event, FIG. 4a could be arranged in northeast position, FIG. 4b in northwest position, FIG. 4c in southwest position and FIG. 4d in southeast position. In FIGS. 4a and 4b, the switch selector banks 82 and 84, respectively, seen in FIG. 1 are shown electrically in detail with their associated circuitry. FIG. 4b also shows toggle switch 86 in detail as well as a highly schematic showing of digital to binary conversion means. FIG. 4c shows a logic diagram of the digital computer. FIG. 4d shows the analog computer loop and the correction circuitry as well as the feedback and correction arrangement whereby the digital computer corrects the analog.

In FIGS. 4a and 4b the selector switch banks 82 and 84 are identical to one another and by virtue of switch 86 may be substituted for one another. Only one bank is in use at a time and the idle bank can be set up while the machinery is in operation to be ready for rapid change over of the machine from one sheet length to another by the flip of switch 86. Since the two banks are essentially identical, similar number designators are used to identify corresponding elements in FIGS. 4a and 4b but primes are added to the numbers of FIG. 4b.

Each of the banks 82 and 84 consists of five wafer switches having discrete positions representing digits for 0 to 9 and dials calibrated to show the digit represented. The switches require either two or three wafers depending upon their positions and there are ten fixed contacts corresponding to ten discrete positions of each of the rotary contracts. A common shaft carries all rotary contacts but insulates them from one another. The switches are identified by their common shaft 87, 88, 89, 90 or 91. Corresponding fixed contact wafers are designated by the same suffix (i.e., a, b, or c) to the switch designator. The switches are adapted to select lengths up to 299.99 inches in increments of 1/100 inch, each switch selecting a particular one of the five digits. Thus switch 87 selects hundredths, switch 88 tenths, switch 89 units, switch 90 tens, switch 91 hundredths. The switches serve two functions. First, they provide decade selection of resistance for the analog loop circuit. Second, they provide binary conversion of each decimal digit into the binary equivalent of the complement of that digit.

Due to mechanical limitations of the machine a minimum sheet length must be provided. In one practical embodiment, and for purpose of illustration herein this has been selected as 28.00 inches. Referring back to FIG. 2 it will be seen that the resistance supplied by switch bank 82 or 84 is resistance 44 in the loop with tachometer generator 34 together with resistors 50 and 52. Resistor 52 is variable either up or down from a predetermined median value by the digital computer as will be explained hereafter. The resistance of resistor 50 and the median resistance of resistor 52 may be selected of such value as to assure the minimum sheet length of 28.0 inches. Resistors 46 and 48 are selected to provide proper balance in the loop with tachometer generator 36 in view the selection of resistors 50 and 52 and the limits of variable resistance 44. The resistance chain therefore has to be arranged so that no matter what length is selected by mistake under 28.00 inches or in the event of failure of the circuitry the machine will never be required to cut sheets shorter than 28.00 inches. This provides the reason for the dual bank of switches 89b, 90b and 91b and 89a, 90a and 91a. Were it not for the fact that a resistance representing 28.00 inches, invariably included in the loop in resistors 50 and the switches 87a, 88a, 89a, 90a and 91a would be sufficient. In that event a fixed incremental amount of resistance, say 1 ohm, could represent 1/100" of increased length. This, in fact, is the case with switches 87a and 88a. Let us assume for simplicity throughout the rest of this description that the circuit parameters are worked out so that 1 ohm additional in the loops with tachometer generator 34 produces 1/100" additional length.

The switch bank 82 shown in FIG. 4a is used to connect resistors in the loop between lines 93 and 94. Switches 87a and 88a connect their resistors in series with whatever additional resistance is supplied by manipulation of switches 89, 90 and 91. Line 93 is connected to the rotary contact member of switch 87a and the fixed terminals of that switch are connected to line 95 through resistances graduated in sizes different from one another by 1 ohm and arranged to supply the number of ohms required to reprint a like number of hundredths of an inch. Line 95 is, in turn, connected to the rotary contact of switch 88a. The fixed terminals of switch 88a are connected to line 96 through resistances differing from one another by 10 ohms and arranged to represent successive tenths of an inch. Line 96 is connected to line 94 through switches 89, 90 and 91. Since switch 87a represents the hundredths digit, the fixed contact representing zero will have no resistance between it and line 95; the fixed contact representing .01 inch will have 1 ohm resistance between it and line 95; the fixed contact representing .02 inch will have 2 ohms resistance between it and line 95; the contact representing .03 inch will have 3 ohms resistance between it and line 95, etc., up to the contact representing .09 inch which will have 9 ohms resistance between it and line 95. The selection of the hundredths digit is accomplished by positioning the rotary contact of switch 87a against the appropriate fixed contact representative of the digit selected and thereby connecting into the loop circuit the number of ohms to represent the desired number of hundredths of an inch in the analog circuit. The same general thing is true of switch 88a which connects its associated selected resistance in series with the resistance selected by switch 87a. In this case, however, the resistance varies in 10 ohm increments of even multiples of 10 as described. The same kind of resistor arrangement is employed with switches 89a and 90a using 100 ohm and 1000 ohm increments, respectively, but, because it is necessary to subtract the 2800 ohms already in the circuit, a complication arises. The 2800 ohms must be deducted from the resistance chain in order to represent the correct total value. Switch 91 preferably has a stop preventing selection of fixed terminals beyond the one representing 200 inches. It will be observed that if the one hundred or two hundred inches of length is selected by switch 91, there is no problem in making the deduction of the full 2800 ohms from the ten thousand or the twenty thousand ohm resistance between the appropriate fixed contact and line 94, and this as a practical matter is what is done. If less than a 100 inch length is selected, however, the deduction must be made elsewhere. However, there is capacity to make the deduction from the amounts of resistance representing twenty nine or more inches. In connection with switch 90 this capacity exists where 3000 ohms (representing 30 inches) or more are employed, although clearly the deduction must not be made both at switch 90 and switch 91. The limitation on the system is that no matter what the setting below 28.00 inches a sheet length of at least 28 inches and in practice between 28.00 inches and 28.99 inches, depending on the settings of switches 87a and 88a, will be cut. Therefore corrections for settings of switches 89 and 90 below 29 have no practical effect, but a correction must also be provided for a setting of 29.

In view of what has been said above, it will be clear that it is necessary to provide alternative switch arrangements whereby, when the switch 91a is set at zero, correction is made by deducting the 2800 ohms from the resistances associated with switch 90b or 89b and connecting these switches and resistance in the loop. But if switch 91a is in position to select 1 or 2 as the hundredths digit, switches 89a and 90a, respectively, are connected into the resistance chain. These alternative possibilities are controlled by switch 91b whose rotatable contact is connected by lead 97 to the rotatable contact of switch 91a. All of the fixed contacts of switch 91b except the zero contact are connected together and by lead 98 to the fixed contacts of switch 90a through the appropriate resistances without the deduction of 2800 ohms. The rotary contact of switch 90a is connected, in turn, through lines 105 and 104 to the fixed terminal of switch 89a through the appropriate resistances without any deduction. The rotary contact of switch 89a is connected by leads 103 and 96 to the fixed contacts of switch 88a through its resistance as previously described.

The zero fixed contact of switch 91b is connected through lead 99 to the rotatable contact of switch 90b, thereby bypassing switch 90a. When positioned to contact fixed contacts representing tens digits of thirty and above, the resistors connected to the fixed contacts make the 2800 ohm deduction. In this event the selected resistor of switch 90b will be connected in series with the selected resistor of switch 89a by line 104. In the event that the tens digit is 2, connection will be made by line 100 from the fixed contact representing 2 in switch 90b to the fixed contacts of switch 89b which are shorted together except for a resistance of 100 between the 8 and 9 terminals. In the event that the 2 terminal of switch 90b is selected when switch 91 is in zero position, the connection will be through line 97, switch 91b, line 99, switch 90b, the rotary contact and line 100 to the shorted fixed terminals of switch 89b. If the setting of switch 89 is 9 the 100 ohm resistance is connected in series through the rotatable terminal to line 101 and the resistors in series with switches 88a and 87a. If the rotary terminal of switch 89b is in any other position the rotary contact will provide a connection without resistance to line 101 and the resistors in series with switches 88a and 87a. In the event that the tens digit is set at zero or 1, with the hundreds on zero, the rotary contact of switch 90b will bypass switch 89a to line 101 establishing the 28" minimum length. Thus (as a safety measure) it is impossible to set a length shorter than 28".

As previously mentioned, the decade resistor arrangements of switch banks 82 and 84 are identical and so arranged that by means of switch 86 one is switched into the loop with tachometer generator 34 and the other is switched out of the loop so that it can be prepared for the next sheet length to be run. The selected resistance chain is connected by means of switches 86a and 86b seen in FIG. 4b to lines 107 and 108 into the resistance loop of tachometer generator 34 (see FIG. 2). The switches 86a and 86b in the position shown in FIG. 4b, employ the resistance chain selected by connecting lines 93 and 94 to lines 107 and 108. When the toggle switch 86 is thrown to its alternative position, lines 107 and 108 are connected to lines 93' and 94' thereby employing the resistance chain selected by switches 84, shown in FIG. 4b.

The other switches bearing suffix c have a different function as pointed out above. They serve to provide a reference to the selected length for use by the digital computer. The switches 87c, 88c, 89c, 90c, and 91c of FIG. 4a correspond exactly to switches 87c', 88c', 89c', 90c' of FIG. 4b and alternatively serve the same function. It will be noted that each of these switch wafers also has ten fixed contacts each corresponding to the selected decimal digit and a rotary contact whereby one of the digit representing fixed contacts is selected. The rotary contacts are connected in common through line 110 or 110' alternatively by switch 86c to a low voltage D.C. power source through line 111. Switch 86c is coordinated with switches 86a and 86b so that the same bank of switches will be selected for both functions by setting the dials shown in FIG. 1.

The purpose of switches 87c, 88c, 89c, 90c and 91c is conversion of each of the decimal digits into its binary equivalent. This is accomplished by conversion means 115, 116, 117, 118 and 119, each having separate lines connected at least to nine of the ten fixed terminals of each of the switches with but one conversion means serving alternatively for the corresponding switches in FIGS. 4a and 4b. The nine or ten lines required are schematically shown gathered into multiconductor cables. The nature of the actual multiwire connections can be seen in FIG. 4b wherein the actual circuitry from switch 87c to binary converter 115 is in a dashed box. It will be understood that all of the connections between the various switches and their respective converters are of this same type. It will be observed that each of the decimal fixed switch contacts except 9 is connected to one or more of four collecting terminals in converter 115, such that terminal 115a represents binary bit 1, terminal 115b represents binary bit 2, terminal 115c represents binary bit 4 and terminal 115d represents binary bit 8. Furthermore, it will be observed that connection is such that instead of the selected decimal number its complement less 1 is selected in the binary connection. This is the reason why no connections are required to the 9 terminals. Decimal 1 is connected to binary bit 8; 2 is connected to binary bits 4, 2 and 1; 3 is connected to binary bits 4 and 2; 4 is connected to binary bits 4 and 1; 5 is connected to binary bit 4; 6 is connected to binary bits 2 and 1; 7 is connected to binary bit 2; and 8 is connected to binary bit 1. Rectifiers are used in lines in order to prevent circulating currents by assuring the flow of current only from the fixed decimal contact to the binary bit terminal. Terminals 115a, 115b, 115c and 115d may be regarded as the terminals of a gate circuit which also has a terminal 115e connected to line 120. Upon presentation of a pulse from line 120 to terminals 115e, 116e, 117e, 118e and 119e (or corresponding terminals in the gates of converters 116, 117, 118 and 119), the potential, if any, on each of the binary bit terminals of that converter will permit a pulse to pass to its associated multivibrator group 121 (or multivibrator groups 122, 123, 124 and 125) in a multivibrator counter chain.

FIG. 5 shows in greater detail the multivibrator counter circuit schematically shown as multivibrator groups 121, 122, 123, 124 and 125 in FIG. 4b. Thus in FIG. 5 the multivibrators 121a, 121b, 121c and 121d in group 121 are each fed from its corresponding binary terminals 115a, 115b, 115c and 115d, respectively, through the gating circuit described. As will appear hereafter, the arrangement is such that the multivibrators in the chain will all start in conductive mode so that pulses from the binary terminals will set up the count in the multivibrators by making non-conductive those representative of the complement of the selected digit less 1. In the actual situation shown in switch 87c', since switch 87c' was set at 5, the complementary less 1 of the count would be 4 and only terminal 115c would be connected to the potential source. When a pulse is applied at terminal 115e then only multivibrator 121c would be changed to the off-state. As also can be seen in FIG. 5, in addition to the fixed voltage from terminal 115c assuring multivibrator 121c will begin in the off-state, pulses from pulse train generator 127 will be fed to multivibrator 121a when another pulse appears at "and" gate 126 to render it conducting. It will be noted that the bi-stable multivibrator 121a will pass a pulse on to 121b when conducting but will not pass a pulse on when non-conducting. Similarly, 121b will pass a pulse on to 121c when conducting and 121c will pass a pulse on to 121d when conducting. Thus, the pattern of states of multivibrators 121a, 121b, 121c and 121d will occur as shown in the following chart, wherein 1 indicates a conducting condition and 0 indicates a non-conducting condition:

State of Gate (conducting = 1, non-conducting = 0)

| Number | Pulses from 127 | | | |
|---|---|---|---|---|
| | Gate 121a | Gate 121b | Gate 121c | Gate 121d |
| 0 | 1 | 1 | 0 | 1 |
| 1 | 0 | 0 | 1 | 1 |
| 2 | 1 | 0 | 1 | 1 |
| 3 | 0 | 1 | 1 | 1 |
| 4 | 1 | 1 | 1 | ²1 |
| 5¹ | 0 | 1 | 1 | ³0 |
| 6 | 1 | 1 | 1 | 0 |
| 7 | 0 | 0 | 0 | 1 |
| 8 | 1 | 0 | 0 | 1 |
| 9 | 0 | 1 | 0 | 1 |
| 10 | 1 | 1 | 0 | 1 |
| 11 | 0 | 0 | 1 | 1 |
| 12 | 1 | 0 | 1 | 1 |
| 13 | 0 | 1 | 1 | 1 |
| 14 | 1 | 1 | 1 | ²1 |
| 15¹ | 0 | 1 | 1 | 0 |
| 16 | 1 | 1 | 1 | 0 |
| 17 | 0 | 0 | 0 | 1 |
| 18 | 1 | 0 | 0 | 1 |
| 19 | 0 | 1 | 0 | 1 |
| 20 | 1 | 1 | 0 | 1 |

[1] Produces output from 128.
[2] Set 128.
[3] Set by 128 output.

It will be observed that the first pulse from pulse source 127 will render multivibrator 121a non-conducting, pass on and render multivibrator 121b non-conducting. FIG. 4b reveals that with switch 87' set on 5, it will take four pulses from pulse source 127 to establish all multivibrators 121a, 121b, 121c, and 121d on the on state. This will produce the four inputs to "and" gate 128 necessary for it to conduct. The 5th pulse from pulse source 127 will turn multivibrators 121a, 121b, 121c, and 121d off as well as passing through "and" gate 128. From gate 128 the fifth pulse will turn multivibrators 121b and 121c back on and register one count in multivibrator chain 122. Thereafter, it will then take 9 counts from pulse source 127 through multivibrator chain 121 to put multivibrators 121a, 121b, 121c and 121d in the on state again to provide the necessary four inputs to "and" gate 128 to permit another output to pass through that gate. Thus, the 5th, 15th, 25th etc. pulse from 127 will produce a pulse to 122. It will be seen by inspection that multivibrator group 122 is exactly like group 121, except that it will be receiving pulses once for every ten reaching gate group 121 after the first pulse is received. The pulses will act on multivibrator group 122 in the same way they do on group 121 and after all of the multivibrators in group 122 are turned on "and" gate 129 will pass a pulse to multivibrator group 123. Since the pattern of multivibrator group 122 is analogous to that of group 121, it will be clear that every tenth pulse to gate 122 after the first pulse passes to multivibrator group 123 will cause another pulse to multivibrator group 123. The same thing is true of multivibrator group 123, i.e., after all its multivibrators are turned on, its "and" gate 130 will pass a pulse to multivibrator group 124 and thereafter for every ten pulses passing multivibrator group 123, one pulse will be fed to multivibrator group 124. Once multivibrator group 124 is turned on, every tenth pulse passing multivibrator group 124 will generate a pulse to multivibrator group 125 through "and" gate 131. Multivibrator group 125 when it reaches the condition that all multivibrators are turned on will pass a pulse through "and" gate 132 which, as can be seen in FIG. 4c, will return to multivibrator 133 and turn it off, thus stopping the pulses passing "and" gate 126.

Referring to FIG. 4c, it will be seen that the pulse forming components are the pulse train generator 127 previously referred to, the web measuring pulse transducer 66, the shear pulse detector 70, which here is subdivided into two detectors 70a and 70b to avoid complicated switching, and the phototube detector 72. The web measuring pulse transducer 66, produces pulses at a variable rate depending upon the rate of movement of the web. Pulses are preferably produced by transducer 66 at the rate of one pulse for each hundredth of an inch of linear length of the material measured. The maximum rate is 13,000 pulses per second, giving a minimum pulse length of 77 microseconds. The pulse generator 127 generates pulses at a fixed rate faster than the maximum rate of the web measuring pulse transducer. The purpose of the pulse train is to provide pulses to be counted by counter 135. Counter 135 is a straight multivibrator chain for counting in binary by pulses fed from one multivibrator to another as in the chain of FIG. 5. Counting is done in much the same way except that the counts are not limited to 8 but goes as high as 16,384. Counter 135 also has a gate-down provision whereby upon the application of a pulse to an "and" gate terminal 135a each of the conducting multivibrators passes its pulse to corresponding multivibrators in reversible counter 136. The multivibrators each have a re-set terminal and a common connection to each of them 135r. A pulse applied at terminal 135r will re-set all of the multivibrators in counter 135 to non-conducting condition so that a new count can be made at the count terminal 135c of the No. 1 multivibrator. Reversible counter 136 has a reverse count terminal 136b at one end of its multivibrator chain such that counting proceeds downwardly from any predetermined count which may have been passed from counter 135 as pulses are fed to terminal 136b. A re-set terminal 136r representing a common connection to reset all multivibrators to non-conducting condition is also provided.

Counts left in counter 136, which may be plus or minus, after down-counting are fed through time delay bank 137 providing a time delay network for each multivibrator of counter 136 to corresponding multivibrators in adder accumulator counter 138. Since the maximum count has been counted down in counter 136, it is presumed that the maximum error could be accounted for by a counter chain whose multivibrator representing the largest binary count represents 1024 and adder accumulator counter 138 has such capacity. The time delay bank 137 also provides a sequencing action and requires the pulse applied to delay network 1 to pass the count from multivibrator 1 of counter 136 to the corresponding multivibrator in counter 138 before delay network 2 will pass the count of multivibrator 2 from counter 136 to counter 138. The count in multivibrator 4 will similarly be delayed until after the count in multivibrator 2 is passed; the count in multivibrator 8 will be delayed until the count in multivibrator 4 is passed, etc. The added delay of each delay network over the previous may be, for example, 3 microseconds which gives sufficient time for counts on the adder accumulator counter 138 to add in the new error counts whether positive or negative to those previously accumulated and do all necessary carry operations.

Another chain of delay networks is also employed for obtaining a time sequencing of pulse application. These delay networks 139, 140, 141, 142 and 143 preferably have a 5 microsecond time delay period, giving a total time delay of 25 microseconds or appreciably less than 77 microseconds between pulses from transducer 66. Still another time delay network 144 is employed in a pulse doubling network which will be explained hereafter. In addition to multivibrator 133, there are also individual multivibrators 146, 147 and 148. There are three "and" gates 149, 150 and 151 in addition to gate 126 and one "or" gate 152.

Operation of the digital computer can now be understood by reference to the logic diagram of FIG. 4c. As observed above pulse generator 127 produces pulses at a very high fixed frequency. The pulses generated are fed to the "and" gate 126 but will not be passed until the path through multivibrator 133 is conducting. Assuming that the multivibrator 133 is rendered conductive, the "and" gate 126 will then permit pulses from the generator to flow simultaneously to the multivibrator chain 121, 122, 123, 124 and 125 of FIGS. 4b and 5 as described above and simultaneously to the counter terminal 135c of binary counter and storage transfer 135. Since the complement of the sheet length is stored in the multivibrators of the decimal to binary converter 121–125 by turning on certain multivibrators, pulses will continue from the pulse generator 127 until all the multivibrators in the decimal to binary converter are turned on so that the next pulse passes through the multivibrator chain and into multivibrator 133 to change its state and changes the path through it from conducting to non-conducting. Thereupon further flow of pulses from the generator is stopped since the signal is removed from "and" gate 126. Because the multivibrator chain 121–125 has been set to represent the complement of the selected digits less one, they will be counted up to nine (the all conducting state) and the one additional pulse will pass through and render all of them non-conducting and ready to receive the next count when a signal is supplied to gate down the settings of converters 115–119. Since the same number of pulses flow to the binary code counter and storage transfer 135, a count of pulses equal to the selected sheet length in inches times 100 is established in counter 135. To this point the operation is the same whether unprinted or preprinted liner is employed.

Consider first the situation with unprinted material which is the condition selected by the operator by closing switches 155a and 155b to the positions shown. The first of the continuous train web advance pulses from transducer 66 after the shear pulse will then be permitted to go through "and" gate 149 to present a pulse to delay circuit 139. After the delay period of circuit 139, this pulse passes on to multivibrator 148 to change its state from that set by the shear pulse, thus removing its effect on "and" gate 149 and preventing the further passage of pulses from transducer 66 through gate 149. Since the delay time (e.g. 5 microseconds) of delay circuit 139 is shorter than the shortest possible time interval between web advance pulses (e.g. 77 microseconds) from transducer 66, there is no possibility that more than one pulse will pass through "and" gate 149. At the same time, the pulse which changes the state of multivibrator 148 after it leaves delay circuit 139 also passes to delay circuit 140. Upon entering delay circuit 140, but without delay, the pulse goes to the time delay circuit 137 causing transfer of the count in the counter 136 to the adder accumulator counter 138. After the delay (e.g. 5 microseconds) in circuit 140, the pulse then passes to terminal 136r to then reset counter 136 to zero before passing into delay circuit 141. Without delay upon entering the delay circuit 141, the pulse immediately passes to counter terminal 135a of counter 135 and causes it to gate down or transfer its count to counter 136. The multivibrator chain of counter 136 is thereby preset in binary code to a value equal to the sheet length in hundredths of an inch. After the delay (e.g. 5 microseconds) in delay circuit 141, the pulse passes on to delay circuit 142 and immediately resets binary counter and storage transfer 135 through reset terminal 135r. Binary counter and storage transfer 135 having passed on its count, is then cleared to be counted up to the selected length by pulses from pulse generator 127, as previously explained. After the further delay (e.g. 5 microseconds) in delay circuit 142, the pulse passes on to delay circuit 143 and immediately passes through line 120 to terminals 115e, 116e, 117e, 118e and 119e causing the selected count converted to binary terms to pass from converters 115, 116, 117, 118 and 119 to their respective multivibrators in multivibrator groups 121, 122, 123, 124 and 125 ready to be counted down by pulses from pulse generator 127. Finally, the pulse after further delay (e.g., 5 microseconds) in delay circuit 143 passes to multivibrator 133 to render it conductive and, as previously explained, thereby permit "and" gate 126 to allow the flow of pulses simultaneously to binary counter and storage transfer 135 and multivibrator chain 121, 122, 123, 124 and 125.

Meantime the continuous flow of web advance pulses from transducer 66 occurs every 1/100 inch, are amplified to the desired voltage level and fed to the counting terminal 136b of reversible binary counter 136. The preselected count representing sheet length has been previously transferred to counter 136 by the pulse applied to gate down terminal 136a. Each pulse produces a change in the state of one or more multivibrators of reversible binary counter 136 as it counts down from the preselected sheet length count toward zero. This counting down will continue until the next shear pulse from transducer 70a is applied by the process mentioned above to the reset and gate down terminal 136r, thus causing counter 136 to be set to zero momentarily while at the same time passing any count that may be in the various multivibrators of counter 136 through their corresponding delay network in bank 137 to the adder accumulator 138. Since adjacent shear pulse constitutes a measure of one sheet length, at the shear pulse the count counted into the reversible counter 136 to count down the preselected length should be identical with the preselected length if there is no error. If no error exists, there will be no count left in counter 136 to pass on to error accumulator counter 138. However, if, due to slippage or otherwise, the sheet length is too short, the pulses from transducer 66 will not have been as many as those stored on the counter. In this event, a positive error count indicating that the sheet is too short and requires additional resistance in the analog loop will be passed on to adder accumulator 138. On the other hand, if the pulses from transducer 66 are more numerous than the count on counter 136, a negative error count will appear, indicating that too much resistance is in the analog loop and this will appear as a negative count or be subtracted from a positive count in the adder accumulator 138. The multivibrators of the adder accumulator will then act upon relay chain 160 through amplifiers 157, as will be described hereafter, to produce the desired correction.

It will be observed that the pulse which is permitted to pass the "and" gate 149 by the presence of a shear pulse 70a at multivibrator 148 will be counted by counter 136. This occurs each time because of the delay in delay circuits 139. Moreover, despite the delay in circuits 140, 141 and 142, the pulse advances sufficiently rapidly to perform all operations that it has to perform well in advance of the occurrence of the next pulse from transducer 66, so that all accumulating, clearing, counting down and gating down operations are complete before the next pulse occurs.

When running preprinted liner, the object it to maintain the cut in register with or in some relative position to a printed register mark monitored by a photo-detector 72. In this case, the switches 155a and 155b are closed to the alternative terminals shown open here. Each time a printed register mark on the web 10 passes the photo-pickup 72 a pulse is generated. The object will be accomplished when the pulses from pickup 72 appear as close as possible in point of time to shear pulses from transducer 70b monitoring the knife cylinders 20 (see FIG. 1). When pulses essentially coincide so that the cut occurs at the exact desired position on the web with respect to the printing, the counter functions exactly as previously described for plain unprinted material except that pulses from transducer 66 instead of flowing directly to terminal 136b of reverse counter 136 will instead pass intermediately through "and" gate 151 which under the circumstances mentioned will be conductive. However, if the pulse from shear pulse transducer 70b is in advance of the pulse from phototube transducer 72, the pulses from web measuring pulse transducer 66 are blocked by the removal of the conductive condition of multivibrator 147 which keeps gate 151 open. Under these circumstances, no counting will begin until the pulse from phototube 72 occurs. On the other hand, if the pulse from phototube pick-up 72 precedes the pulse from shear transducer 70b, the pulses will pass through "and" gate 150 and be doubled by means of a bypass and delay network, as will be described hereafter, before passing through switch 155b to counter 136.

The signals from shear transducer 70b and phototube pick-up 72 are never in exact synchronism so that if they are in substantially exact synchronism their pulses will reach "or" gate 152 sequentially and twice change the state of the bi-stable multivibrator so as to render it non-conductive and then immediately render it conductive once again. Assuming that the pulse from transducer 70b passes through "or" gate 152 first and renders it non-conducting, the "and" gate 151 will block pulses from transducer 66. The pulse from transducer 70b will also render multivibrator 146 non-conducting and thereby block "and" gate 150 as well so that no pulses reach reversible counter 136. The result will be that the countdown is cut off and does not reach zero so that a large positive error count calling for a greatly increased resistance will remain when the count on counter 136 is passed to adder-accumulator 138. Assuming on the other hand that the pulse from photo-pickup 72 leads the pulse from transducer 70b by a substantial amount, again the pulse from 72 will pass through the "or" gate and render multivibrator 147 non-conducting. However, in this case, the pulse from 72 renders multivibrator 146 conducting and a signal is taken off the part of multivibrator 147 which is conducting so that "and" gate 150 is rendered conductive and passes pulses from transducer 66. These pulses pass around the delay network 144 and through switch 155b to counter terminal 136b. The same pulses pass through delay network 144 which delays the pulse for half the minimum time between pulses in the pulse train from transducer 66 and thereby intersperses pulses between those coming directly from transducer 66, thus, in effect doubling the number of pulses. This will have the effect of counting the counter down well below zero so that a large negative error calling for removal of resistance from the analog loop is passed to adder accumulator 138. The arrangement described provides a novel method of control whereby by shutting off the pulses the computer permits large corrections to be accomplished rapidly in one direction and by doubling pulses the computer permits the large corrections to be accomplished rapidly in the other direction.

The adder accumulator 138 is a counter much like counter 135 whose bi-stable multivibrators represent binary bits in the binary code. A pulse into each of the bits will change its state from "on" to "off" or "off" to "on" and a change from "on" to "off" will pass a pulse along to the next higher bit to cause it to change its state. The multivibrators of binary bits of counter 138 if "on" will pass a signal to their corresponding respective power amplifiers in amplifier group 157. Each amplifier raises the signal supplied to it to the necessary level to energize the coil of its associated relay in relay chain 160 (see FIG. 4d). Each relay coil has one side through its individual power line connected to its associated amplifier of group 157 and the other side connected by a common line to ground. When a particular coil is energized, it acts upon its associated switch contacts to change their normal state. As can be seen in FIG. 4d, the relay coils are generally designated as chain 160 with individual relay coils designated 160a–160k. The switches operated by the relays are designated generally 161 and individually designated 161a–161k. The switches are individually connected in parallel with a plurality of resistors in a chain 162, individual resistors being designated 162a–162k. As can be seen the switches 161a–161j have normally closed contacts so that the resistances with which they are in parallel are normally shorted out of the loop circuit. Switch 160k is normally open, however, so that its resistance is normally in series with the rest of the loop resistance. The resistances 162a–162k are in a binary series so that resistance 162a is 1 ohm, 162b is 2 ohms, 162c is 4 ohms, 162d is 8 ohms, 162e is 16 ohms, 162f is 32 ohms, 162g is 64 ohms, 162h is 128 ohms, 162i is 256 ohms, 162j is 512 ohms and 162k is 1024 ohms. 162k is normally in the circuit and normally supplies 1024 ohms to the loop. The binary value of the multivibrator of the adder accumulator counter 138 of FIG. 4c effectively causes addition to or subtraction from this total amount. Therefore, the error totaled by the adder accumulator counter through its action upon its corresponding relays will tend to set up a pattern of weighted resistances corresponding to that in the multivibrators. Since resistor 162k is normally in the circuit the count is up from or down from its 1024 ohms. Thus, if the sheet is severed 1/100 inch too short, the error from counter 136 will be transferred through the resistance previously described from the No. 1 multivibrator of counter 136 which will be in the "on" state passing adder accumulator counter 138 and energizing coil 160a. The contacts 161a will be opened so that an additional 1 ohm (resistor 162a) will be introduced in series in the loop with resistor 162k and the resistors 50 and 44. Larger errors will show up in exactly the same way operating on the binary sequence of resistors to add the proper amount of resistance in series with the 1024 ohms of resistor 162k. On the other hand, if the sheet should be severed 1/100 inch too long, all the multivibrators of counter 136 will be in "on" state and, as previously described, this will cause all of the coils 160a–160k to be energized, thus changing the state of all of the switches 161a–161k. Therefore, all of the resistors 162a–162j will be introduced into the loop but the resistor 162k whose normally open switch will be closed while the other normally closed switches are open. The total of all resistances other than 161h is 1023 ohms, 1 ohm less than resistor 161k alone. The effect then is of subtracting 1 ohm from total loop resistance. Larger errors when the sheet tends to be too long will effect the circuit reducing the count supplied by the resistor chain 162 even more.

As previously described increasing the computer supplied resistance 52 will reduce the potential at terminal 56 with respect to terminal 54 ultimately causing motor 32 to turn counterclockwise. As previously described, such counterclockwise rotation of motor 32 shortens the sheet length by increasing the average rotational speed of the knife cylinder. An increase in resistance 52 will cause just the reverse action.

Adder accumulator counter 138 is an accumulator because it retains counts on its multivibrators as previously set and undergoes no clearing from one count to the next as do the other counters of the system. Instead it adds to or subtracts from the resistance present during operation on the previous sheet. Thus, if a sheet is too short, resistance is added and retained until its removal is called for in whole or in part, or, if it is too long, it is removed and thereafter omitted until the computer indicates it is again required. Such adjustment from the point last employed as a reference permits the system to correct errors not only in sheet length due to slippage and synchronizing problems but within the system itself, such as errors in generator voltage or errors due to variation in the magnitude of the resistors from time to time.

The control system of FIG. 4d employs an amplifier phaser 58 to determine which pair of thyratrons 165a and 165b or 166a and 166b will fire. This will be determined by which terminal 56 or 54 has a higher voltage and the effect will be applied to the proper grid control circuit 167 or 168. A.C. power is supplied through a center tapped transformer 169 through the thyratron circuit to the armature of motor 32 across whose field a constant voltage of 230 volts D.C. is applied. The motor 32 will respond not only to the direction but to the size of the voltage applied across it which will be in proportion to the control signal applied to the thyratron grid. Should the correction applied through 32 be insufficient, the higher voltage level applied to the grid of one of the tubes 170 and 171 will render one of these tubes conductive. If the signal is such that the sheet is short, tube 170 will be rendered more highly conductive and allow current flow through its associated transformer from supply 172 to act on the coil of normally open relay 173 thereby closing its switch 173a. Conversely, if the sheet is too long, tube 171 will conduct and through its transformer will apply voltage to its relay 174 to cause its associated contacts 174a to close. Each of these sets of contacts is in series with another relay 175 and 176, respectively, and each of these last mentioned relays has three normally open switches which when closed will cause motor 40 to be connected to a three phase energy source 177 to rotate in one direction and the other relay so connects it to source 177 that it will rotate in the other direction. Thus, if the sheet is too short, motor 40 will be energized by the closing of relay 175 to cause adjustment of the Reeves drive 22 to produce a slowing down of the knife speed of cutter 20. Conversely, if the sheet size is too long, relay 176 will close and cause adjustment of the Reeves drive in the other direction.

It will be appreciated from the above that the differential motor 32 is the minor or fine sheet length adjustment, and it automatically adjusts the Reeves drive through motor 40 when motor 32 reaches its limit in ability to correct.

The computer arrangement of FIGS. 2–5 is a highly precise device which permits running correction at such a rate as to assure the correction of errors within the length of the sheet being severed. Thus, except possibly for extreme ranges of error such as those which might occur upon a change in length selection of sheet lengths is held to great accuracy from one sheet to another in the course of long periods of operation.

Another type of computer network which can be used with the machine of FIG. 1 and which is somewhat simpler than the system of FIGS. 2–5 is shown in FIGS. 6 and 7. In this drawing, those elements which correspond to those in FIG. 1 are indicated by the same number designators but with the addition of primes thereto. As before, the continuous sheet material or web 10' is driven by a double facer 12' driven by prime mover 18' through connecting mechanism 16', 14'. Prime mover 18' also drives cut-off rollers 20' through a speed-adjusting mechanism 22' which may be a Reeves drive or like device, and which enables the adjustment of the relative speed of the cut-off rollers 20' with respect to the double facer 12'. As in FIG. 1, a crank mechanism 26' is provided at the cut-off rollers to provide the desired operational characteristics and a differential 30' is supplied, in addition to the Reeves' drive, for making relatively smaller adjustments in the relative speeds of the double facer and the cut-off rollers. In order to accomplish these adjustments, a correction motor 32' to drive the differential 30' is provided. If major adjustment is required, it can be accomplished through correction motor 40' acting upon the relative speed control or Reeves' drive 22'. The circuitry for making the corrections through motor 32' or motor 40' may be the same as that shown in FIG. 4c and the circuitry beyond terminals 56, 54, but any of the many equivalent or alternative systems available might be acceptable as well.

As in the prior case, sensing means in the form of the web pulse generator 66' with its wheel or roller 68' contacting web 10', the sheer pulse detector 70' cooperating with a part of the cut-off rollers 20', and photo-tube pickup 72' for use with register marks on preprinted liner are employed and function in precisely the same way. In this case, however, instead of a tachometer generator 36 for producing a voltage effect, a pulse generator 37 is employed to monitor the speed of the cut-off rollers by producing a pulse chain having so many pulses per revolution of the cutter roller 20'. Again, a console 80' may house sheet length selection means and associated circuitry, but the circuitry and mechanism of accomplishing the result is somewhat different.

In this case, instead of feeding the output of the pulse generator 37 into an analog loop, the pulses are fed into binary multiplier 180. From here, the modified pulse chain passes alternatively through either one or the other of sheet length selectors 181 or 182, depending upon which is placed in the circuit by selector switch 183. Again the use of two sheet length selector switch banks enables adjustment of the idle one so that it is ready for the next run. Pulses flow from the binary multiplier as permitted by sheet length selection through inhibitor gate 184 into the reversible binary counter 185. At the same time, pulses from web pulse generator 66' are fed directly through inhibitor gate 186 into reversible binary counter 185. When plain liner is being run, the inhibitor gates 184 and 186 are arranged to be constantly conducting in order to pass pulses without interruption. Since pulse generator 37 is gear driven by the input shaft to the knife cylinder crank 26', its r.p.m. is constant for a given sheet length and board speed and it produces pulses in a given multiple of knife cylinders average rotational speed in rotations per minute. Preferably the gearing selected causes the pulse generator 37 to produce 4096 pulses for each revolution of the knife cylinders. The arrangement is such that transducer 66' produces 4096 counts for 128 inches of board length or one pulse for each 1/32 inch of board advance. The pulses produced by the board transducer 66' are directly compared with pulses which pass through the binary multiplier 180 from the pulse generator 37 and produce a correction in a manner which will be described hereafter if there is a difference in the pulse count from generator 37 as modified by multiplier 180 and transducer 66'. Obviously the cutter must be speeded up to cut lengths shorted than 128 inches and must be slowed down to cut sheet longer than 128 inches. Under either of these circumstances the binary multiplier must supply the difference in number of pulses to make the 4096. In accordance with the system shown and described herein, the knife cylinders 20' may be speeded up to cut sheet lengths shorter than 128" but may not be slowed down. In the event that sheets longer than 128" are to be cut, a times two switch 187 shown on FIG. 6 will cut in half the number of pulses reaching 185 from 66'. This has the effect of doubling the sheet length selected on 181 or 182. Thus the longest sheet would then be 256 15/16 inches. Since the pulse generator 66' will produce 4096 pulses, the number produced each rotation of knife cylinder 20', for every 128 inches of sheet length assuming no slippage, if a shorter length is to be obtained, it must appear that generator 37 produces less than 4096 so that the apparent error will cause the cutter to speed up. The circuitry required to produce this effect is the binanry multiplier and sheet length selection switches shown in FIG. 7. It will be seen in FIG. 7 that the pulses from pulse generator 37 enter multivibrator 188a, the first of a chain of multivibrators 188a–188–1 similar to those in conventional binary counters such as counter 135 in FIG. 4c. The pulses progress along the chain as they do in a normal counter, changing the state of the multivibrators reached and passing through each conductive multivibrator. In addition, each pulse passing through a multivibrator is passed to an "and" gate 189a–189–1, whose suffixes correspond to those of their associated multivibrators. If a suitable potential is applied to the other terminal of the "and" gate, the pulse from the multivibrators will pass through to a collector line 193 and on to inhibitor gate 184. By means of switch 183 either bank 181 or bank 182 of sheet length selector switches is made effective. In the position of switch 183 shown bank 181 is effective and each of the switches connected to the left hand terminal as illustrated is connected through a D.C. voltage source 194. The voltage source is selected of proper size to apply the required potential through the switch to its corresponding "and" gate and thereby permit pulses applied to that "and" gate from its corresponding multivibrator to pass through. Since the multivibrators pass pulses only when conductive, only half as many pulses as actually reach them are passed through. Thus, half the 4096 or 1024 pulses pass through "and" gate 189a for each revolution of the cutter knife if switch 181a is closed. If all the other switches were open and it would mean that in order for the cutter knife to produce 4096 pulses at the inhibitor gate 184, and hence at the binary counter 185, the cutter would have to rotate twice as fast and hence cut the sheets at 64 inch lengths instead of at 128 inch lengths. Only one-quarter of the number of pulses pass through multivibrator 188b to gate 189b as are generated by a single revolution of the cutter 20'. In the event that switch 181b is the only switch closed to the left-hand position thus rendering "and" gate 189b conductive, the cutter will have to rotate four times as fast in order to generate the 4096 pulses in the corresponding time they are generated by transducer 66'. In such event sheets will be cut to 32 inch lengths. It will be seen by analogy that closing switch 181c and by opening the other switches in bank 181, when it is the bank selected, would cause the cutter to cut a 16 inch length. By closing two or more switches in bank 181 at the same time, because of the delay in passing through the additional circuitry, the pulses from later multivibrators in the chain will add to those from earlier multivibrators. Since each pulse may be thought of in terms of transducer 66' as representing 1/32 inch, they will, accordingly, represent this length of board. If all of the switches are closed as shown, the total number of pulses added in this cumulative fashion will be 4095, equivalent to a full 128 inch (minus one pulse) board length. Thus, it will be seen that any desired length of board up to 128 inches may be cut by selecting an appropriate combination of switches which add up to the total length desired. As previously mentioned, switch 181a represents 64 inches; switch 181b represents 32 inches; switch 181c represents 16 inches; switch 181d represents 8 inches; switch 181e represents 4 inches; switch 181f represents 2 inches; switch 181g represents 1 inch; switch 181h represents ½ inch; switch 181i represents ¼ inch; switch 181j represents ⅛ inch; switch 181k represents 1/16 inch; and switch 181–1 represents 1/32 inch.

The mechanism of the correction or length adjustment is somewhat simplified from that of the first described system. The counts passing to the reversible binary counter 185 from the inhibitor gate 184 are counted forward whereas the pulses entering from transducer by way of inhibitor gate 186 are counted in the reverse direction. Any difference in count must be corrected for by adjustment of the differential 30' through correction motor 32' if the error is small or by adjustment of the Reeves' drive 22' through the correction motor 40' if large. The actual circuit for acomplishing this is essentially the same as that shown in FIG. 4d back to the terminals 54, 56. However, before this point there is considerable difference. The pulse count difference put out by the reversible binary counter, which is very much like counter 136 in FIG. 4c, produces an output to a binary weighted resistance matrix 195 which produces a voltage through amplifier 196 proportional to the deviation from the selected length. This voltage may be positive or negative, depending on whether the counts from the transducer 66', out-weigh the counts from the transducer 37, or vice versa. In either event, the voltage produced in this manner corresponds directly to the voltage produced at the terminals 54, 56 in the first described system. Moreover, the corresponding correction system 58'–60' to produce correction through motors 32' and 40' exactly as previously described provides a closed loop correction system for the first time in a system of this type. The action of the binary weighted resistance matrix is essence is merely an arrangement whereby resistances are provided in the outputs from the various multivibrators of the reversible binary counter 185 and are weighted in accordance with the value position of the multivibrator. Therefore outputs of the same voltage level from each of the different multivibrators of the counter are passed through resistance which attenuates the voltage as a dropping resistor so that the total voltage summed at the amplifier 196 is representative of the correction required.

The problem is somewhat complicated in cutting preprinted liners. A shear pulse from transducer 70' is generated with each knife revolution and determines the location of the knife blades with respect to the printed register mark. Each time a printed registered mark on the web 10' passes the photo-pickup 72' a pulse is generated. When these pulses from photo-pickup 72' and shear transducer 70' coincide or are in a predetermined sequence, then cutting will occur at the right place relative to the printed material. In this event, the control functions are performed exactly as previously described for a plain liner.

When cutting preprinted liner, the switch 198 is moved to close the circuits from the pulse sorter 199 to the inhibitor gates 184 and 186. When the switch 198 is closed the potential on the inhibitor gate terminals is subject to an interruption. Assuming that the pulses are supposed to be in synchronism for cutting to occur in the proper place, then should the shear pulse from transducer 70' lead the pulse from photo-pickup 72', the pulses from transducer 66' will be blocked until the lagging pulse from transducer 72' occurs. The function of the pulse sorter 199 is to cause the leading pulse from 70 to induce a change in state of a multivibrator closing inhibitor gate 186 until the lagging pulse from 72 changes its state to re-open gate 186.

On the other hand, when the pulse from the photo-cell 72' leads the pulse from shear transducer 70', the pulses from the cutter transducer 37 are blocked from the reversible binary counter 185 during the interval between the leading pulse from photo-pickup 72' and the lagging pulse from transducer 70'. In this case, the pulse from the photo-pickup 72' closes the inhibitor gate 184 and the lagging pulse from transducer 70' re-opens it. The action of the pulse sorter 199 corresponds to the action of the phase detector of multivibrator 146 and the "and" gate 150.

Several computer means have been shown and described. As described, the computers have been applied to specific machinery, including a double-facer and a rotatable cutter for cutting lengths of corrugated board at predetermined intervals. It will be understood by those skilled in the art, however, that the application could be made to any machine for repetitive processing having feed means, repetitive processing means, and means for automatically and continuously adjusting the relative speeds of the feed and processing means to be automatically controlled so that accurate processing at predetermined intervals can occur. Moreover, two alternative systems have been described for accomplishing this result by means of a closed loop, entirely automatic technique. It will be appreciated by those skilled in the art that other schemes constituting variations and modifications of systems described could be substituted and those described could be varied in many ways. All such modifications and variations within the scope of the claims are intended to be within the scope and spirit of the present invention.

I claim:

1. A computer for use with a machine for repetitive processing of linear material having feed means for driving said linear material along a predetermined path, repetitive processing means along said predetermined path, and means for automatically and continuously adjusting relative speeds of the feed and processing means, including motor drive means, said computer comprising means for sensing the speed of repetitive processing means and producing a signal representative thereof and means for sensing the speed of the linear material and producing a second signal representative thereof, at least one of said sensing means producing a pulsed output the pulse rate of which is representative of the speed sensed, comparison means including length selection means for selecting a preselected length between repetitive processing to compare the speeds sensed against the preselected length and produce an error signal output if the speed sensed would produce a length between successive repetitive processing different from the length preselected and means for feeding immediately upon detection the error signals from the comparison means directly back to the motor drive means for adjusting the relative speeds to make correction in said relative speeds.

2. The apparatus of claim 1 in which the linear material speed measuring means is located just before the repetitive processing means and produces pulses, the number of pulses per unit time being representative of the speed of the linear material just prior to the processing means.

3. The computer of claim 1 in which the linear material is printed and the repetitive processing is to be synchronized with a particular portion of printing, wherein printing pick-up means for detecting printing index marks is provided and means is additionally provided for synchronizing signals from the printing pick-up means and the repetitive processing means.

4. A computer for use with a machine for repetitive processing of linear material having feed means for driving said linear material along a predetermined path, repetitive processing means along said predetermined path and means for automatically and continuously adjusting the relative speeds of the said feed and processing means, including motor drive means, said computer comprising means for sensing the speed of the linear material and producing pulses at a rate representative of the speed of the linear material and means for sensing the speed of the repetitive processing means, comparison means including length selection means for selecting a preselected length between repetitive processing to compare the number of pulses from the linear material sensing means following a signal from the repetitive processing means with a count representative of the number of pulses which would be produced by linear material of the preselected length whereby the difference in said counts produces an error signal, and means for feeding immediately upon detection the error from the comparison means directly back to the motor drive means of the means for automatically and continuously adjusting the relative speeds of the feed and processing means.

5. The computer of claim 4 in which the means for making the comparison is a reversible counter and in which the length selection means is effective to provide the counter with a count representative in terms of pulses from the linear material speed sensing means of the preselected length between repetitive processing and the pulses from the linear material sensing means count down from said count.

6. The computer of claim 5 in which the length selection means includes a high frequency pulse generator to generate pulses to establish a count and means for counting exactly the number of pulses representative of the count and for cutting off the pulses when the count is achieved.

7. The computer of claim 6 in which the pulses from the high frequency pulse generator are fed simultaneously to a counter for cumulative counting and to a gating network set by the length selection means to pass a pulse all the way through the network only when the count representative of the preselected length has been reached and means to cut off further flow of pulses to the cumulative counter upon this occurrence.

8. The computer of claim 7 in which pulses from the high frequency pulse generator pass through an "and" gate, said "and" gate being rendered conductive by a multivibrator upon receiving a pulse indicative of the actuation of the repetitive processing means and being rendered non-conductive by said multivibrator upon the occurrence of the pulse passing all the way through the gating network set by the length selection means.

9. The computer of claim 5 in which an "and" gate is provided and the reversible counter passes any error by gating down its error count to the error correction system upon the occurrence at the "and" gate of simultaneous signals from the linear material sensing means and the repetitive processing speed sensing means indicating the occurrence of the processing.

10. The computer of claim 9 in which a first delay network is provided and the signal from the repetitive processing speed sensing means renders conductive a multivibrator connected to an input terminal of the "and" gate, to the other input terminal of which is connected the linear material sensing means, and the output terminal of the "and" gate is connected through the first delay network to the multivibrator to terminate its conduction before the next linear material sensing pulse as well as to the gating down terminal of the reversible counter.

11. The computer of claim 7 in which an "and" gate, a multivibrator and a sequence of delay networks are provided and the reversible counter passes any error determined by gating down its error count to the error correction system upon the occurrence at an "and" gate of simultaneous signals from the linear material sensing means and the repetitive processing speed sensing means indicating the occurrence of the processing and in which the repetitive processing speed sensing means renders conductive a multivibrator connected to an input terminal of the "and" gate to the other input terminal of which is connected the linear material sensing means, and the output terminal of the "and" gate is connected through the sequence of further delay networks, the output of the first delay network being fed back to the multivibrator to terminate its conduction before the next linear material sensing pulse as well as to the gating down terminal of the reversible counter and the outputs of following successive delay networks' outputs are fed, respectively, to the cumulative counter first to gate down the last completed count to the reversible counter, reset the counter to zero and finally to means initiating a further flow of pulses to the cumulative counter.

12. The computer of claim 11 in which an intermediate counter accumulator is provided to receive counts from the reversible counter to be added to previous error counts to give a total error count and a further delay network is provided to provide a further delay following the resetting of the multivibrator after which the adder-accumulator may be gated down to the means for feeding the error signal to the motor means.

13. The computer of claim 5 in which means for sensing printed register marks and producing a pulse once each predetermined length is provided, such that when said pulse occurs in and coupled with the repetitive processing sensing means through a comparison circuit, synchronism with the single pulse produced each predetermined length by the repetitive processing sensing means, the processing will occur at the proper position relative to the printing, and in which the comparison means causes the error signal generated to be modified if the pulses are not in synchronism.

14. The computer of claim 13 in which an "and" gate is provided in the comparison circuit, through which the reversible counter is counted down and which will pass no signal if the pulses do not occur substantially simultaneously until the other lagging pulse occurs, following which it will permit pulses to occur, so that a short count will result and cause an error signal to slow the repetitive processing to cut a longer sheet.

15. The computer of claim 14 in which a multivibrator is provided to render one output to the "and" gate non-conductive by the first pulse and conductive by the second pulse so that the "and" gate is rendered non-conductive by the first pulse and conductive by the second pulse.

16. The computer of claim 13 in which an "and" gate is provided in the comparison circuit, through which the reversible counter is counted down, and which will pass no signal if one pulse leads the other but which will pass the pulse signal to count down the reversible counter if said one pulse lags said other in which case the signal passing the "and" gate is subjected to pulse multiplication so that a long count will result and cause an error signal to speed the repetitive processing to cut a shorter sheet.

17. The computer of claim 16 in which the comparison circuit includes first and second multivibrators and first and second "and" gates either of which permits passage of the pulse signal are provided so connected that the output of the first multivibrator to the "and" gate is rendered conductive thereby rendering the first "and" gate conductive only if the print pulse is leading and the output of the second multivibrator is rendered conductive thereby rendering the second "and" gate conductive upon the occurrence of one pulse and nonconductive upon the occurrence of the other.

18. The computer of claim 4 in which the means for feeding errors to the motor means for automatically and continuously adjusting the relative speeds is a pair of analog loops providing resistance in series with each of a pair of tachometer generators, one operated by the feed means and the other operated by the repetitive processing means so that each produces a voltage output proportional to the speed of its driving device, the length selection means functioning to provide resistance in series with one tachometer generator proportional to the desired length between corresponding points in the continuous processings so that differences in voltage occurring between selected points in the two loops will serve to produce an error signal to drive the motor means and in which further errors sensed with respect to the continuous material by the computer act to modify the resistance in one of the analog loops.

19. A computer for use with a machine for repetitive processing of linear material having feed means for driving said linear material along a predetermined path, repetitive processing means along said predetermined path and means for automatically and continuously adjusting the relative speeds of the feed and processing means, including motor means, said computer comprising means for sensing the speed of the linear material and producing pulses at a rate representative of the speed of the linear material and means for sensing the speed of the repetitive processing means and producing pulses at a rate representative of the speed of the means such that at one particular speed of the repetitive processing means the number of pulses produced by its pulse producing means will equal the number of pulses representative of a length of continuous material exactly equal to the length between continuous processings, and comparison means for comparing the number of pulses from each source and feeding any difference in the number of pulses, constituting an error signal, to the motor means of the means for automatically and continuously adjusting the relative speeds of the feed and processing means.

20. The computer of claim 19 in which pulse modification means is provided between one of the pulse producing means and the comparison means to modify the pulse count of that pulse producing means such that the difference in pulse counts resulting generates an error signal to produce a change in relative speed of the comparative processing means with respect to the drive means such that a modified length between repetitive processings is obtained.

21. The computer of claim 20 in which the means to modify the pulse count includes length selection means, for selecting a preselected length between repetitive processings.

22. The computer of claim 21 in which the sheet length selector employs binary multiplier means to modify the number of pulses fed to the comparison means for a given speed of the device producing the pulses, the selector means being calibrated in terms of the length between corresponding points in successive repetitive processing operations.

23. The computer of claim 22 for use with print register marks to obtain registration between the print register marks and the repetitive processing means in which inhibitor gates are provided in each of the lines between the pulse producing means and the comparison means and in which means for sensing the print register mark and generating a pulse and means for sensing the position of the repetitive processing means and generating a pulse are employed such that when the printing is in proper registration with the repetitive processing means, their respective pulses will have a predetermined relationship and in the event of improper registration one of the inhibitor gates be caused to suppress the counts from its associated pulse producing means.

24. The computer of claim 23 in which pulses occur simultaneously when the print is in proper registration and in which should the print registration pulse lead the count pulse the inhibitor gate in the sheet length pulse line will block pulses representing the linear speed of the continuous material in order to produce a pulse difference at the comparison means which will cause the repetitive processing means to slow down.

25. The computer of claim 23 in which pulses occur simultaneously when the print is in proper registration and in which should the print registration pulse lag the count pulse, the inhibitor gate in the repetitive processing pulse line will block pulses representing the speed of the continuous material in order to produce a pulse difference at the comparison means which will cause the repetitive processing means to speed up.

References Cited by the Examiner
UNITED STATES PATENTS

| | | |
|---|---|---|
| 2,817,775 | 12/1957 | Rosenberg et al. |
| 2,932,471 | 4/1960 | Exner et al. _____ 235—151 X |
| 2,944,737 | 7/1960 | Cail et al. _____ 235—151 |
| 3,015,129 | 1/1962 | Hays et al. _____ 235—151 |
| 3,015,974 | 1/1962 | Orbom et al. |
| 3,029,675 | 4/1962 | Alexander et al. _____ 83—76 |
| 3,048,751 | 8/1962 | Taylor _____ 83—76 X |
| 3,096,670 | 7/1963 | Stringer _____ 235—151 |
| 3,176,557 | 4/1965 | Drenning et al. _____ 83—76 |

OTHER REFERENCES

Gordon: "Adapting Digital Techniques for Automatic Controls," Electrical Manufacturing, pp. 136–143, 332, November 1954.

Gordon: "Adapting Digital Techniques for Automatic Controls," Electrical Manufacturing, pps. 120–125, 298, 300, December 1954.

MALCOLM A. MORRISON, *Primary Examiner.*

DARYL W. COOK, *Examiner.*

C. L. WHITHAM, I. KESCHNER, *Assistant Examiners.*